United States Patent
Trikalinou et al.

(10) Patent No.: US 11,755,500 B2
(45) Date of Patent: Sep. 12, 2023

(54) CRYPTOGRAPHIC COMPUTING WITH DISAGGREGATED MEMORY

(71) Applicant: Intel Corporation, Santa Clara, CA (US)

(72) Inventors: Anna Trikalinou, Hillsboro, OR (US); Abhishek Basak, Bothell, WA (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 17/134,332

(22) Filed: Dec. 26, 2020

(65) Prior Publication Data

US 2021/0117340 A1    Apr. 22, 2021

(51) Int. Cl.
*G06F 12/14* (2006.01)
*G06F 9/50* (2006.01)
*G06F 12/06* (2006.01)

(52) U.S. Cl.
CPC ........ *G06F 12/1408* (2013.01); *G06F 9/5016* (2013.01); *G06F 9/5083* (2013.01); *G06F 12/063* (2013.01); *G06F 12/1433* (2013.01)

(58) Field of Classification Search
CPC .... G06F 9/5016; G06F 9/5083; G06F 12/063; G06F 12/1408; G06F 12/1433; G06F 21/6218; G06F 2212/1052; H04L 9/0631; H04L 9/0637
See application file for complete search history.

(56) References Cited

U.S. PATENT DOCUMENTS

| | | | |
|---|---|---|---|
| 9,185,088 B1* | 11/2015 | Bowen | H04L 63/0471 |
| 2017/0171223 A1* | 6/2017 | Barsness | G06F 12/1408 |
| 2019/0102568 A1 | 4/2019 | Hausauer et al. | |
| 2020/0125501 A1* | 4/2020 | Durham | G06F 12/1458 |

OTHER PUBLICATIONS

EPO; Extended European Search Report issued in EP Patent Application No. 21197174.2, dated Mar. 14, 2022; 9 pages.
Taranov, Konstantin, et al.; "sRDMA—Efficient NIC-based Authentication and Encryption for Remote Direct Memory Access," Proceedings of the 2020 USENIX Annual Technical Conference, Jul. 15-17, 2020; retrieved from the Internet at https://www.usenix.org/conference/atc20/presentation/taranov; 16 pages.

* cited by examiner

*Primary Examiner* — Aracelis Ruiz
(74) *Attorney, Agent, or Firm* — Alliance IP, LLC

(57) ABSTRACT

In one embodiment, an application executing on a host node allocates a memory address of a remote node. The application selects, based at least in part on device capability information for the host and remote nodes, one of the host node or the remote node to encrypt application data, and configures the selected node to encrypt the application data based on a key and a pointer to the memory address of the remote node.

20 Claims, 19 Drawing Sheets

CRYPTOGRAPHIC COMPUTING WITH DISAGGREGATED MEMORY

FIELD

This disclosure relates in general to the field of computer systems, and more particularly, to cryptographic computing.

BACKGROUND

Cryptographic computing may refer to computer system security solutions that employ cryptographic mechanisms inside of processor components to protect data stored by a computing system. The cryptographic mechanisms may be used to encrypt the data itself and/or pointers to the data using keys, tweaks, or other security mechanisms. Cryptographic computing is an important trend in the computing industry, with the very foundation of computing itself becoming fundamentally cryptographic. Cryptographic computing represents a sea change, a fundamental rethinking of systems security with wide implications for the industry.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts.

DETAILED DESCRIPTION

Figure 1:
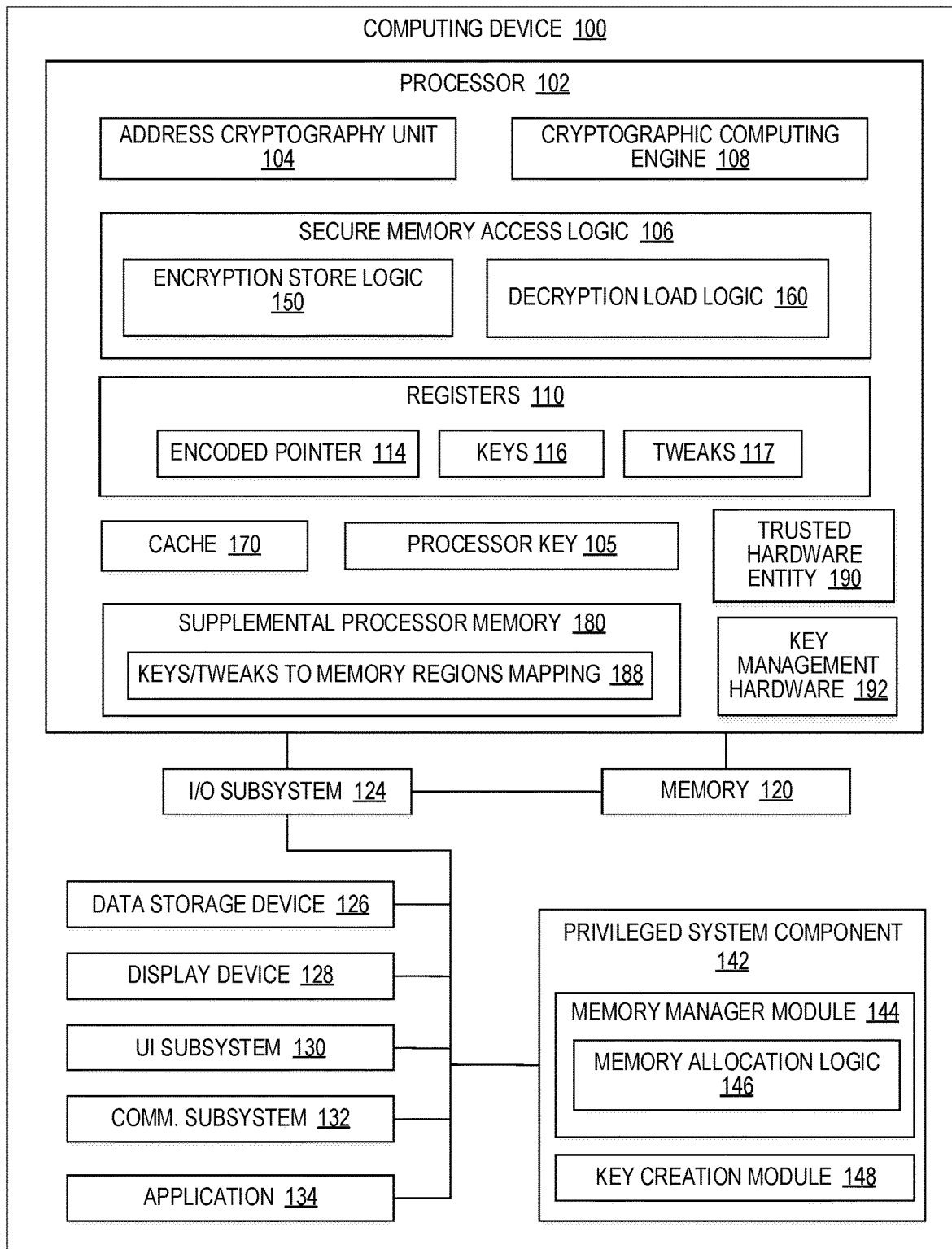
FIG. 1 is a simplified block diagram of an example computing device configured with secure memory access logic according to at least one embodiment of the present disclosure.

This disclosure provides various possible embodiments, or examples, for implementations of memory write instructions that may be used in the context of cryptographic computing. Generally, cryptographic computing may refer to computer system security solutions that employ cryptographic mechanisms inside processor components as part of its computation. Some cryptographic computing systems may implement the encryption and decryption of pointer addresses (or portions thereof), keys, data, and code in a processor core using encrypted memory access instructions. Thus, the microarchitecture pipeline of the processor core may be configured in such a way to support such encryption and decryption operations.

Embodiments disclosed in this application are related to proactively blocking out-of-bound accesses to memory while enforcing cryptographic isolation of memory regions within the memory. Cryptographic isolation may refer to isolation resulting from different regions or areas of memory being encrypted with one or more different parameters. Parameters can include keys and/or tweaks. Isolated memory regions can be composed of objects including data structures and/or code of a software entity (e.g., virtual machines (VMs), applications, functions, threads). Thus, isolation can be supported at arbitrary levels of granularity such as, for example, isolation between virtual machines, isolation between applications, isolation between functions, isolation between threads, or isolation between data structures (e.g., few byte structures).

Encryption and decryption operations of data or code associated with a particular memory region may be performed by a cryptographic algorithm using a key associated with that memory region. In at least some embodiments, the cryptographic algorithm may also (or alternatively) use a tweak as input. Generally, parameters such as 'keys' and 'tweaks' are intended to denote input values, which may be secret and/or unique, and which are used by an encryption or decryption process to produce an encrypted output value or decrypted output value, respectively. A key may be a unique value, at least among the memory regions or subregions being cryptographically isolated. Keys may be maintained, e.g., in either processor registers or processor memory (e.g., processor cache, content addressable memory (CAM), etc.) that is accessible through instruction set extensions. A tweak can be derived from an encoded pointer (e.g., security context information embedded therein) to the memory address where data or code being encrypted/decrypted is stored or is to be stored and, in at least some scenarios, can also include security context information associated with the memory region.

At least some embodiments disclosed in this specification, including read and write operations, are related to pointer based data encryption and decryption in which a pointer to a memory location for data or code is encoded with a tag and/or other metadata (e.g., security context information) and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. In some pointer encodings, a slice or segment of the address in the pointer includes a plurality of bits and is encrypted (and decrypted) based on a secret address key and a tweak based on the metadata. Other pointers can be encoded with a plaintext memory address (e.g., linear address) and metadata.

For purposes of illustrating the several embodiments for proactively blocking out-of-bound memory accesses while enforcing cryptographic isolation of memory regions, it is important to first understand the operations and activities associated with data protection and memory safety. Accordingly, the following foundational information may be viewed as a basis from which the present disclosure may be properly explained.

Known computing techniques (e.g., page tables for process/kernel separation, virtual machine managers, managed runtimes, etc.) have used architecture and metadata to provide data protection and isolation. For example, in previous solutions, memory controllers outside the CPU boundary support memory encryption and decryption at a coarser granularity (e.g., applications), and isolation of the encrypted data is realized via access control. Typically, a cryptographic engine is placed in a memory controller, which is outside a CPU core. In order to be encrypted, data travels from the core to the memory controller with some identification of which keys should be used for the encryption. This identification is communicated via bits in the physical address. Thus, any deviation to provide additional keys or tweaks could result in increased expense (e.g., for new buses) or additional bits being "stolen" from the address bus to allow additional indexes or identifications for keys or tweaks to be carried with the physical address. Access control can require the use of metadata and a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or object bounds information).

Cryptographic isolation of memory compartments (also referred to herein as 'memory regions'), resolves many of the aforementioned issues (and more). Cryptographic isolation may make redundant the legacy modes of process separation, user space, and kernel with a fundamentally new fine-grain protection model. With cryptographic isolation of memory compartments, protections are cryptographic, with various types of processor units (e.g., processors and accelerators) alike utilizing secret keys (and optionally tweaks) and ciphers to provide access control and separation at increasingly finer granularities. Indeed, isolation can be supported for memory compartments as small as a one-byte object to as large as data and code for an entire virtual machine. In at least some scenarios, cryptographic isolation may result in individual applications or functions becoming the boundary, allowing each address space to contain multiple distinct applications or functions. Objects can be selectively shared across isolation boundaries via pointers. These pointers can be cryptographically encoded or non-cryptographically encoded. Furthermore, in one or more embodiments, encryption and decryption happens inside the processor core, within the core boundary. Because encryption happens before data is written to a memory unit outside the core, such as the L1 cache or main memory, it is not necessary to "steal" bits from the physical address to convey key or tweak information, and an arbitrarily large number of keys and/or tweaks can be supported.

Cryptographic isolation leverages the concept of a cryptographic addressing layer where the processor encrypts at least a portion of software allocated memory addresses (addresses within the linear/virtual address space, also referred to as "pointers") based on implicit and/or explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address and some bits of encoded metadata (e.g., context information). When decryption of an address is performed, if the information used to create the tweak (e.g., implicit and/or explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor.

These cryptographically encoded pointers (or portions thereof) may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

Although the cryptographically encoded pointer (or non-cryptographically encoded pointers) can be used to isolate data, via encryption, the integrity of the data may still be vulnerable. For example, unauthorized access of cryptographically isolated data can corrupt the memory region where the data is stored regardless of whether the data is encrypted, corrupting the data contents unbeknownst to the victim. Data integrity may be supported using an integrity verification (or checking) mechanism such as message authentication codes (MACS) or implicitly based on an entropy measure of the decrypted data, or both. In one example, MAC codes may be stored per cacheline and evaluated each time the cacheline is read to determine whether the data has been corrupted. Such mechanisms, however, do not proactively detect unauthorized memory accesses. Instead, corruption of memory (e.g., out-of-bounds access) may be detected in a reactive manner (e.g., after the data is written) rather than a proactive manner (e.g., before the data is written). For example, memory corruption may occur by a write operation performed at a memory location that is out-of-bounds for the software entity. With cryptographic computing, the write operation may use a key and/or a tweak that is invalid for the memory location. When a subsequent read operation is performed at that memory location, the read operation may use a different key on the corrupted memory and detect the corruption. For example, if the read operation uses the valid key and/or tweak), then the retrieved data will not decrypt properly and the corruption can be detected using a message authentication code, for example, or by detecting a high level of entropy (randomness) in the decrypted data (implicit integrity).

FIG. 1 is a simplified block diagram of an example computing device 100 for implementing a proactive blocking technique for out-of-bound accesses to memory while enforcing cryptographic isolation of memory regions using secure memory access logic according to at least one embodiment of the present disclosure. In the example shown, the computing device 100 includes a processor 102 with an address cryptography unit 104, a cryptographic computing engine 108, secure memory access logic 106, and memory components, such as a cache 170 (e.g., L1 cache, L2 cache) and supplemental processor memory 180. Secure memory access logic 106 includes encryption store logic 150 to encrypt data based on various keys and/or tweaks and then store the encrypted data and decryption load logic 160 to read and then decrypt data based on the keys and/or tweaks. Cryptographic computing engine 108 may be configured to decrypt data or code for load operations based on various keys and/or tweaks and to encrypt data or code for store operations based on various keys and/or tweaks. Address cryptography unit 104 may be configured to decrypt and encrypt a linear address (or a portion of the linear address) encoded in a pointer to the data or code referenced by the linear address.

Processor 102 also includes registers 110, which may include e.g., general purpose registers and special purpose registers (e.g., control registers, model-specific registers (MSRs), etc.). Registers 110 may contain various data that may be used in one or more embodiments, such as an encoded pointer 114 to a memory address. The encoded pointer may be cryptographically encoded or non-cryptographically encoded. An encoded pointer is encoded with some metadata. If the encoded pointer is cryptographically encoded, at least a portion (or slice) of the address bits is encrypted. In some embodiments, keys 116 used for encryption and decryption of addresses, code, and/or data may be stored in registers 110. In some embodiments, tweaks 117 used for encryption and decryption of addresses, code, and/or data may be stored in registers 110.

A processor key 105 (also referred to herein as a 'hardware key') may be used for various encryption, decryption, and/or hashing operations and may be configured as a secure key in hardware of the processor 102. Processor key 105 may, for example, be stored in fuses, stored in read-only memory, or generated by a physically unclonable function that produces a consistent set of randomized bits. Generally, processor key 105 may be configured in hardware and known to processor 102, but not known or otherwise available to privileged software (e.g., operating system, virtual machine manager (VMM), firmware, system software, etc.) or unprivileged software.

The secure memory access logic 106 utilizes metadata about encoded pointer 114, which is encoded into unused bits of the encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding provided by the secure memory access logic 106 can prevent the encoded pointer 114 from being manipulated to cause a buffer overflow, and/or can prevent program code from accessing memory that it does not have permission to access. Pointers may be encoded when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded pointer 114, which points to the allocated memory, is encoded with the address metadata.

The address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments, other metadata (or context information) can be encoded in the unused bits of encoded pointer 114 such as a size of plaintext address slices (e.g., number of bits in a plaintext slice of a memory address embedded in the encoded pointer), a memory allocation size (e.g., bytes of allocated memory referenced by the encoded pointer), a type of the data or code (e.g., class of data or code defined by programming language), permissions (e.g., read, write, and execute permissions of the encoded pointer), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc. For example, in one embodiment, the address metadata can include size metadata that encodes the size of a plaintext address slice in the encoded pointer. The size metadata may specify a number of lowest order bits in the encoded pointer that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating a version value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). In one example, decryption load logic 160 and encryption store logic 150 are embodied as part of new load (read) and store (write) processor instructions that perform respective decryption and encryption operations to isolate memory compartments. Decryption load logic 160 and encryption store logic 150 verify encoded metadata on memory read and write operations that utilize the new processor instructions (e.g., which may be counterparts to existing processor instructions such as MOV), where a general purpose register is used as a memory address to read a value from memory (e.g., load) or to write a value to memory (e.g., store).

The secure memory access logic 106 is executable by the computing device 100 to provide security for encoded pointers "inline," e.g., during execution of a program (such as a user space application 134) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., a register (where "memory" may refer to main memory or cache, e.g., a form of random access memory, and "register" may refer to a processor register, e.g., hardware), or any instruction that accesses or manipulates memory. Also as used herein, "memory access instruction" may refer to, among other things, a "MOV" or "STORE" instruction or any other instruction that causes data to be read, copied, or otherwise accessed at one storage location, e.g., a register, and moved into another storage location, e.g., memory, or any instruction that accesses or manipulates memory.

The address cryptography unit 104 can include logic (including circuitry) to perform address decoding of an encoded pointer to obtain a linear address of a memory location of data (or code). The address decoding can include decryption if needed (e.g., if the encoded pointer includes an encrypted portion of a linear address) based at least in part on a key and/or on a tweak derived from the encoded pointer. The address cryptography unit 104 can also include logic (including circuitry) to perform address encoding of the encoded pointer, including encryption if needed (e.g., the encoded pointer includes an encrypted portion of a linear address), based at least in part on the same key and/or on the same tweak used to decode the encoded pointer. Address encoding may also include storing metadata in the noncanonical bits of the pointer. Various operations such as address encoding and address decoding (including encryption and decryption of the address or portions thereof) may be performed by processor instructions associated with address cryptography unit 104, other processor instructions, or a separate instruction or series of instructions, or a higher-level code executed by a privileged system component such as an operating system kernel or virtual machine monitor, or as an instruction set emulator. As described in more detail below, address encoding logic and address decoding logic each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key (e.g., keys 116), in order to secure the encoded pointer 114 at the memory allocation/access level.

The encryption store logic 150 and decryption load logic 160 can use cryptographic computing engine 108 to perform cryptographic operations on data to be stored at a memory location referenced by encoded pointer 114 or obtained from a memory location referenced by encoded pointer 114. The cryptographic computing engine 108 can include logic (including circuitry) to perform data (or code) decryption based at least in part on a tweak derived from an encoded pointer to a memory location of the data (or code), and to perform data (or code) encryption based at least in part on a tweak derived from an encoded pointer to a memory location for the data (or code). The cryptographic operations of the engine 108 may use a tweak, which includes at least a portion of the encoded pointer 114 (or the linear address generated from the encoded pointer) and/or a secret key (e.g., keys 116) in order to secure the data or code at the memory location referenced by the encoded pointer 114 by binding the data/code encryption and decryption to the encoded pointer.

Various different cryptographic algorithms may be used to implement the address cryptography unit 104 and cryptographic computing engine 108. Generally, Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer-based encryption have also emerged recently. The PRINCE cipher, for example, can be implemented in 3 clocks requiring as little as 799 ?m2 of area in the IO nm process, providing half the latency of AES in a tenth the Silicon area. Cryptographic isolation may utilize these new ciphers, as well as others, introducing novel computer architecture concepts including, but not limited to: (i) cryptographic addressing, e.g., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the referenced data, or any suitable combination thereof as tweaks for the data encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation or other more complex logic) with an input block to produce the encrypted or decrypted block. In some block ciphers, the keystream is fed into the next block cipher to perform encryption or decryption.

The example encoded pointer 114 in FIG. 1 is embodied as a register 110 (e.g., a general purpose register of the processor 102). The example secret keys 116 may be generated by a key creation module 148 of a privileged system component 142, and stored in one of the registers 110 (e.g., a special purpose register or a control register such as a model specific register (MSR)), another memory location that is readable by the processor 102 (e.g., firmware, a secure portion of a data storage device 126, etc.), in external memory, or another form of memory suitable for performing the functions described herein. In some embodiments, tweaks for encrypting addresses, data, or code may be computed in real time for the encryption or decryption. Tweaks 117 may be stored in registers 110, another memory location that is readable by the processor 102 (e.g., firmware, a secure portion of a data storage device 126, etc.), in external memory, or another form of memory suitable for performing the functions described herein. In some embodiments, the secret keys 116 and/or tweaks 117 are stored in a location that is readable only by the processor, such as supplemental processor memory 180. In at least one embodiment, the supplemental processor memory 180 may be implemented as a new cache or content addressable memory (CAM). In one or more implementations, supplemental processor memory 180 may be used to store information related to cryptographic isolation such as keys and potentially tweaks, credentials, and/or context IDs.

Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, the terms "secret address key" or "address key" may be used to refer to a secret key used in encryption and decryption operations of memory addresses and the terms "secret data key" or "data key" may be used to refer to a secret key used in operations to encrypt and decrypt data or code.

On (or during) a memory allocation operation (e.g., a "malloc"), memory allocation logic 146 allocates a range of memory for a buffer, returns a pointer along with the metadata (e.g., one or more of range, permission metadata, size (power), memory allocation size, type, location, ownership, version, tag, privilege level, crypto context ID, etc.). In one example, the memory allocation logic 146 may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 may be embodied in a memory manager module 144 of the privileged system component 142. The memory allocation logic 146 causes the pointer 114 to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the pointer 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments) is encrypted using a secret address key (e.g., keys 116) and optionally, an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using a secret address key (e.g., keys 116) and an address tweak (if the address tweak was used in the encryption), as described further below.

The encoded pointer 114 is returned to its original (e.g., canonical) form, based on appropriate operations in order to restore the original value of the encoded pointer 114 (e.g., the true, original linear memory address). To do this in at least one possible embodiment, the address metadata encoded in the unused bits of the encoded pointer 114 are removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 may be corrupted as a result of the decrypting process performed on the encrypted address bits in the pointer. A corrupted pointer will raise a fault (e.g., a general protection fault or a page fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides encoded pointer security against buffer overflow attacks and similar exploits.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 106, the address cryptography unit 104, and the cryptographic computing engine 108.

The computing device 100 also includes memory 120, an input/output subsystem 124, a data storage device 126, a display device 128, a user interface (UI) subsystem 130, a communication subsystem 132, application 134, and the privileged system component 142 (which, illustratively, includes memory manager module 144 and key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.).

Processor memory may be provisioned inside a core and outside the core boundary. For example, registers 110 may be included within the core and may be used to store encoded pointers (e.g., 114), secret keys 116 and possibly tweaks 117 for encryption and decryption of data or code and addresses. Processor 102 may also include cache 170, which may be L1 and/or L2 cache for example, where data is stored when it is retrieved from memory 120 in anticipation of being fetched by processor 102.

The processor may also include supplemental processor memory 180 outside the core boundary. Supplemental processor memory 180 may be a dedicated cache that is not directly accessible by software. In one or more embodiments, supplemental processor memory 180 may store the mapping 188 between parameters and their associated memory regions. For example, keys may be mapped to their corresponding memory regions in the mapping 188. In some embodiments, tweaks that are paired with keys may also be stored in the mapping 188. In other embodiments, the mapping 188 may be managed by software.

In one or more embodiments, a hardware trusted entity 190 and key management hardware 192 for protecting keys in cryptographic computing may be configured in computing device 100. Hardware trusted entity 190 and key management hardware 192 may be logically separate entities or combined as one logical and physical entity. This entity is configured to provide code and data keys in the form of an encrypted key from which a code, data, or pointer key can be decrypted or a unique key identifier from which a code, data, or pointer key can be derived. Hardware trusted entity 190 and key management hardware 192 may be embodied as circuitry, firmware, software, or any suitable combination thereof. In at least some embodiments, hardware trusted entity and/or key management hardware 190 may form part of processor 102. In at least some embodiments, hardware trusted entity and/or key management hardware 190 may be embodied as a trusted firmware component executing in a privileged state. Examples of a hardware trusted entity can include, but are not necessarily limited to Secure-Arbitration Mode (SEAM) of Intel® Trust Doman Extensions, etc., Intel® Converged Security Management Engine (CSME), an embedded security processor, other trusted firmware, etc.

Generally, keys and tweaks can be handled in any suitable manner based on particular needs and architecture implementations. In a first embodiment, both keys and tweaks may be implicit, and thus are managed by a processor. In this embodiment, the keys and tweaks may be generated internally by the processor or externally by a secure processor. In a second embodiment, both the keys and the tweaks are explicit, and thus are managed by software. In this embodiment, the keys and tweaks are referenced at instruction invocation time using instructions that include operands that reference the keys and tweaks. The keys and tweaks may be stored in registers or memory in this embodiment. In a third embodiment, the keys may be managed by a processor, while the tweaks may be managed by software.

The memory 120 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 120 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 120 comprises one or more memory modules, such as dual in-line memory modules (DIMMs). In some embodiments, the memory 120 may be located on one or more integrated circuit chips that are distinct from an integrated circuit chip comprising processor 102 or may be located on the same integrated circuit chip as the processor 102. Memory 120 may comprise any suitable type of memory and is not limited to a particular speed or technology of memory in various embodiments.

In operation, the memory 120 may store various data and code used during operation of the computing device 100, as well as operating systems, applications, programs, libraries, and drivers. Memory 120 may store data and/or code, which includes sequences of instructions that are executed by the processor 102.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as one or more user space applications (e.g., application 134) and the privileged system component 142. The user space application may be embodied as any computer application (e.g., software, firmware, hardware, or a combination thereof) that interacts directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 142 facilitates the communication between the user space application (e.g., application 134) and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates the secret keys 116 (e.g., secret address keys and secret data keys) and may write them to a register or registers to which the processor 102 has read access (e.g., a special purpose register). To create a secret key, the key creation module 148 may execute, for example, a random number generator or another algorithm capable of generating a secret key that can perform the functions described herein. In other implementations, secret keys may be written to supplemental processor memory 180 that is not directly accessible by software. In yet other implementations, secret keys may be encrypted and stored in memory 120. In one or more embodiments, when a data key is generated for a memory region allocated to a particular software entity the data key may be encrypted, and the software entity may be provided with the encrypted data key, a pointer to the encrypted data key, or a data structure including the encrypted key or pointer to the encrypted data key. In other implementations, the software entity may be provided with a pointer to the unencrypted data key stored in processor memory or a data structure including a pointer to the unencrypted data key. Generally, any suitable mechanism for generating, storing, and providing secure keys to be used for encrypting and decrypting data (or code) and to be used for encrypting and decrypting memory addresses (or portions thereof) encoded in pointers may be used in embodiments described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor, or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2A:
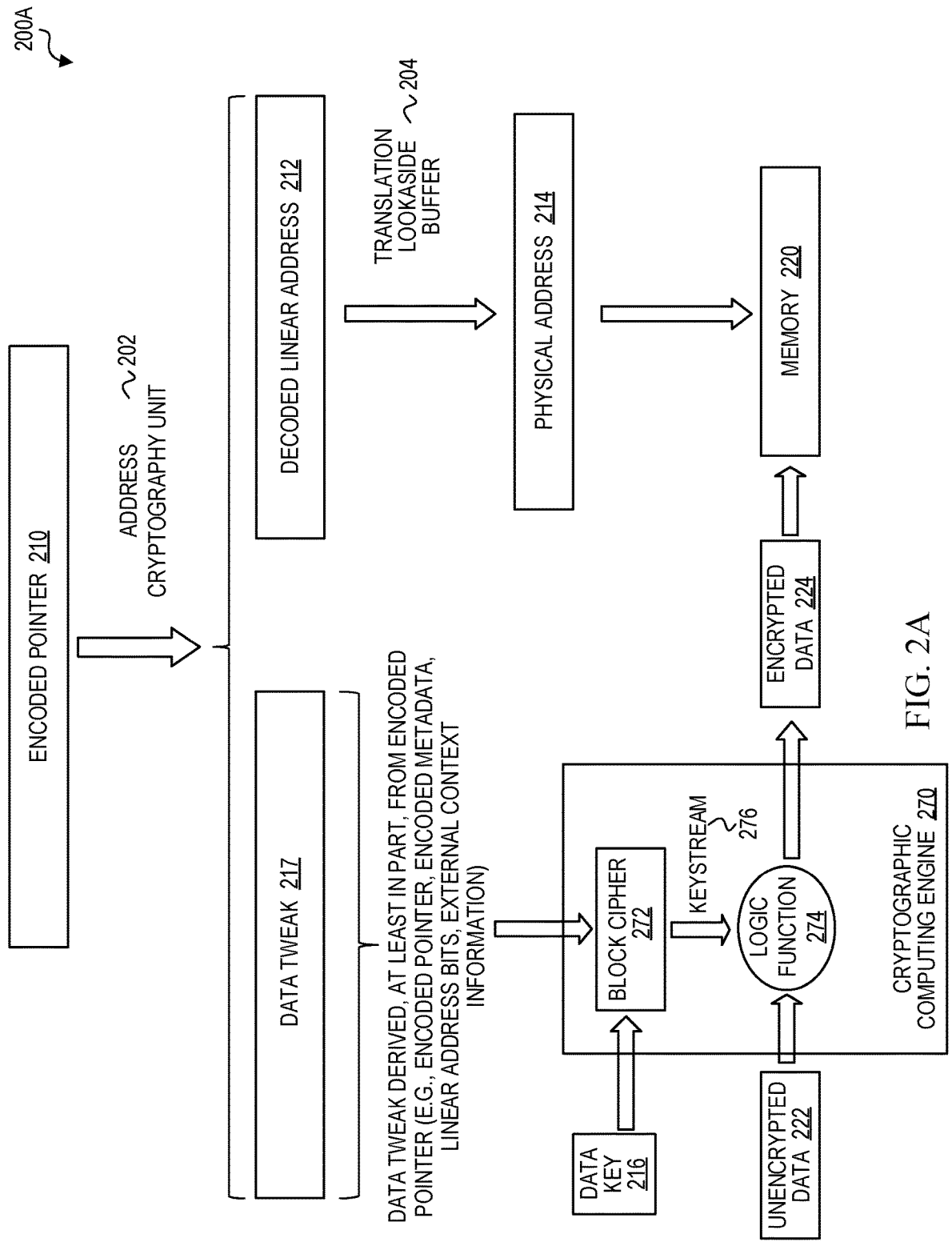
FIG. 2A is flow diagram illustrating a process of binding a generalized encoded pointer to encryption of data referenced by that pointer according to at least one embodiment of the present disclosure.

FIG. 2A is a simplified flow diagram illustrating a general process 200A of cryptographic computing based on embodiments of an encoded pointer 210. Process 200A illustrates storing (e.g., writing) data to a memory region at a memory address indicated by encoded pointer 210, where encryption and decryption of the data is bound to the contents of the pointer according to at least one embodiment. At least some portions of process 200A may be executed by hardware, firmware, and/or software of the computing device 100. In the example shown, pointer 210 is an example of encoded pointer 114 and is embodied as an encoded linear address including a metadata portion. The metadata portion is some type of context information (e.g., size/power metadata, tag, version, etc.) and the linear address may be encoded in any number of possible configurations, at least some of which are described herein.

Encoded pointer 210 may have various configurations according to various embodiments. For example, encoded pointer 210 may be encoded with a plaintext linear address or may be encoded with some plaintext linear address bits and some encrypted linear address bits. Encoded pointer 210 may also be encoded with different metadata depending on the particular embodiment. For example, metadata encoded in encoded pointer 210 may include, but is not necessarily limited to, one or more of size/power metadata, a tag value, or a version number.

Generally, process 200A illustrates a cryptographic computing flow in which the encoded pointer 210 is used to obtain a memory address for a memory region of memory 220 where data is to be stored, and to encrypt the data to be stored based, at least in part, on a tweak derived from the encoded pointer 210. First, address cryptography unit 202 decodes the encoded pointer 210 to obtain a decoded linear address 212. The decoded linear address 212 may be used to obtain a physical address 214 in memory 220 using a translation lookaside buffer 204 or page table (not shown). A data tweak 217 is derived, at least in part, from the encoded pointer 210. For example, the data tweak 217 may include the entire encoded pointer, one or more portions of the encoded pointer, a portion of the decoded linear address, the entire decoded linear address, encoded metadata, and/or external context information (e.g., context information that is not encoded in the pointer).

Once the tweak 217 has been derived from encoded pointer 210, a cryptographic computing engine 270 can compute encrypted data 224 by encrypting unencrypted data 222 based on a data key 216 and the data tweak 217. In at least one embodiment, the cryptographic computing engine 270 includes an encryption algorithm such as a keystream generator, which may be embodied as an AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce a keystream 276 and then a cryptographic operation (e.g., a logic function 274 such as an exclusive-or (XOR), or other more complex operations) can be performed on the unencrypted data 222 and the keystream 276 in order to generate encrypted data 224. It should be noted that the generation of the keystream 276 may commence while the physical address 214 is being obtained from the encoded pointer 210. Thus, the parallel operations may increase the efficiency of encrypting the unencrypted data. It should be noted that the encrypted data may be stored to cache (e.g., 170) before or, in some instances instead of, being stored to memory 220.

Figure 2B:
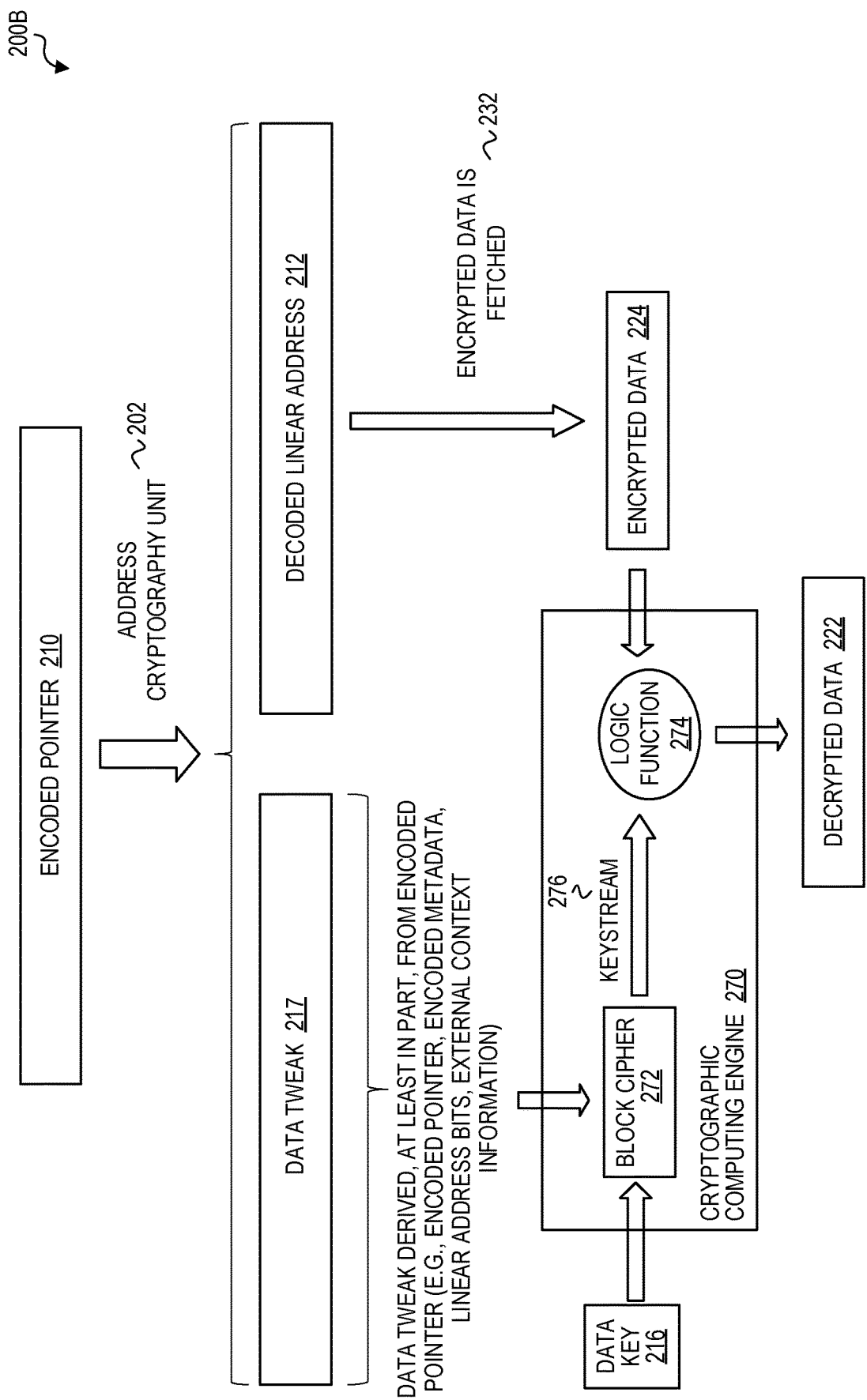
FIG. 2B is flow diagram illustrating a process of decrypting data bound to a generalized encoded pointer according to at least one embodiment of the present disclosure.

FIG. 2B is a simplified flow diagram illustrating a general process 200B of cryptographic computing based on embodiments of encoded pointer 210. Process 200B illustrates obtaining (e.g., reading, loading, fetching) data stored in a memory region at a memory address that is referenced by encoded pointer 210, where encryption and decryption of the data is bound to the contents of the pointer according to at least one embodiment. At least some portions of process 200B may be executed by hardware, firmware, and/or software of the computing device 100.

Generally, process 200B illustrates a cryptographic computing flow in which the encoded pointer 210 is used to obtain a memory address for a memory region of memory 220 where encrypted data is stored and, once the encrypted data is fetched from the memory region, to decrypt the encrypted data based, at least in part, on a tweak derived from the encoded pointer 210. First, address cryptography unit 202 decodes the encoded pointer 210 to obtain the decoded linear address 212, which is used to fetch the encrypted data 224 from memory, as indicated at 232. Data tweak 217 is derived, at least in part, from the encoded pointer 210. In this process 200B for loading/reading data from memory, the data tweak 217 is derived in the same manner as in the converse process 200A for storing/writing data to memory.

Once the tweak 217 has been derived from encoded pointer 210, the cryptographic computing engine 270 can compute decrypted (or unencrypted) data 222 by decrypting encrypted data 224 based on the data key 216 and the data tweak 217. As previously described, in this example, the cryptographic computing engine 270 includes an encryption algorithm such as a keystream generator embodied as AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce keystream 276 and then a cryptographic operation (e.g., the logic function 274 such as an exclusive-or (XOR), or other more complex operations) can be performed on the encrypted data 224 and the keystream 276 in order to generate decrypted (or unencrypted) data 222. It should be noted that the generation of the keystream may commence while the encrypted data is being fetched at 232. Thus, the parallel operations may increase the efficiency of decrypting the encrypted data.

I/O Extensions to Cryptographic Computing

In some embodiments, addressing and cryptographic protections provided by cryptographic computing (CC) may be extended outside of the core and memory hierarchy of a device to other devices connected to the core and memory hierarchy via an input/output (I/O or IO) interconnect. Similar to CC-based object granular memory protection for accesses from the core side, memory accesses from different device contexts on an IO side may require analogous protection to truly secure the system. Importance of IO security is increasing by the day as devices and accelerators (which may be generically referred to as XPUs, which may include central processing units (CPUs), graphical processing units (GPUs), and other types of processing devices) are increasingly being considered as first-class compute elements in computing environments, such as cloud platforms.

In particular, hardware and software changes are enumerated as applicable in detail from the aspect of different IO threat boundaries/protection granularities, starting from coarse grained towards increasingly fine-grained protection akin to that on core side. When referring to the "IO", "IO subsystem", or "IO side" etc., the present description may refer to device interconnects and associated protocols, such as, for example, Peripheral Component Interconnect Express (PCIe)-based and/or Compute Express Link (CXL)-based interconnects and compatible devices (which may be referred to herein as "IO devices") and accelerators on the same system/platform (e.g., 8 socket server platforms).

Figure 3:
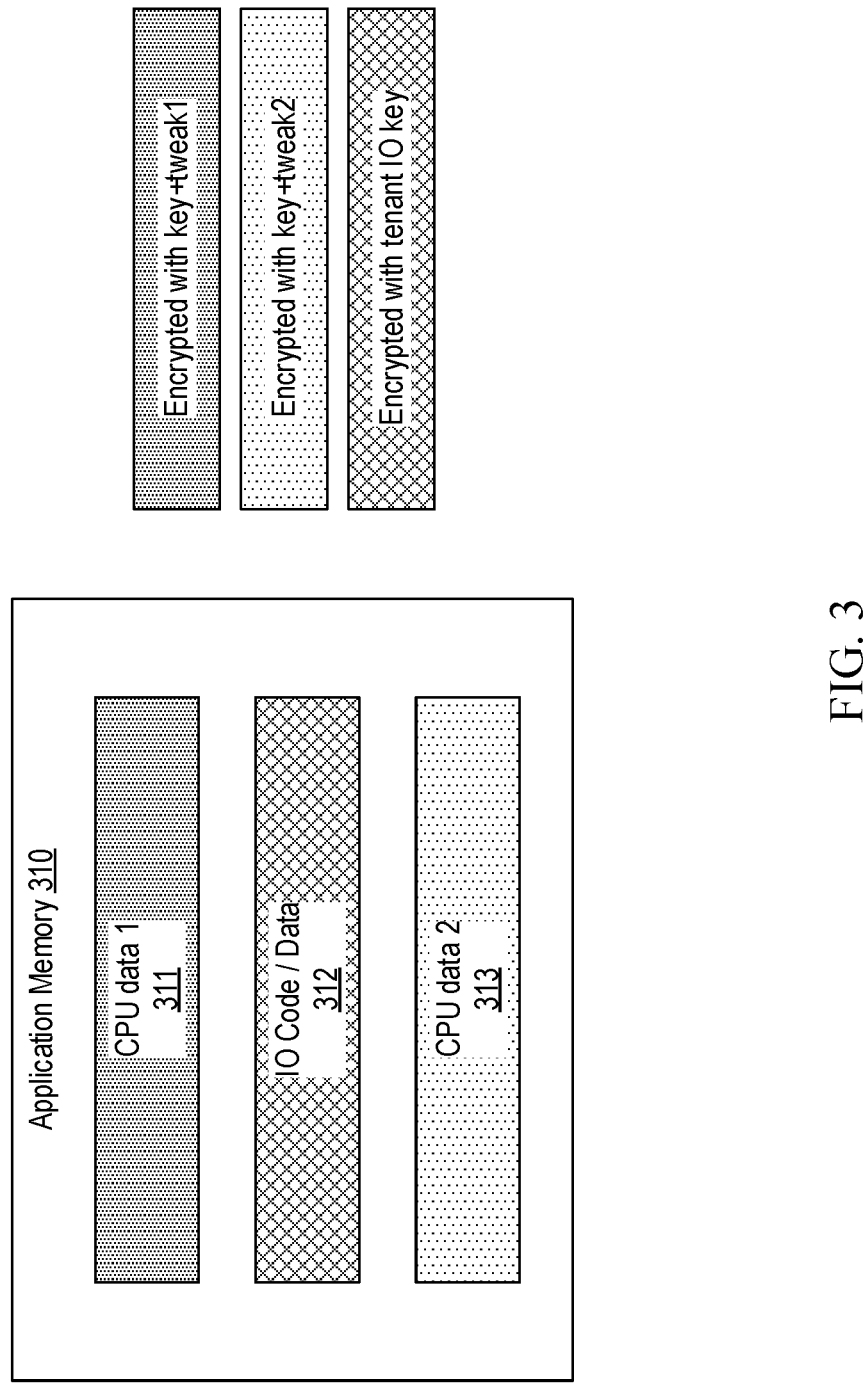
FIG. 3 illustrates another simplified block diagram of an application and data associated with various XPUs executing aspects of the application.

FIG. 3 illustrates another simplified block diagram of application memory 310 and data 311, 312, 313 associated with various XPUs executing aspects of the application. In the example shown, the data 311, 313 are associated with a CPU of a host device, while the data $412 is associated with code or data of an IO device connected to the host device. As shown, each of the data 311, 313 are encrypted when in memory 310, with each being encrypted with different key/tweak pairs (e.g., with context-specific pointer tweaks/ keys) as shown. The encryption of data 311, 313 may be performed in accordance with cryptographic computing embodiments disclosed herein and in in U.S. Pat. No. 9,436,847 (entitled "Cryptographic pointer address encoding") and/or U.S. Patent Application Publication No. 2020/0125501 (entitled "Pointer Based Data Encryption"). The data 312 is also encrypted when stored in memory 310 using a tenant IO key. The tenant IO key may be different from the key(s) used by the CPU via CC enlightened libraries.

These encrypted pointers are sent to the IO device as part of control path operations and the corresponding memory may be initialized accordingly. The actual code/data encryption key (e.g., Gimli/GCM key) can stay the same. If malicious IO access attempts are made (e.g., through forged pointers) outside allowed allocations to CPU code/data structures, either faults would result from IOMMU page walks after pointer decryption or garbage returns/CC integrity failures will result from corresponding reads/writes as described above. In addition, untrustworthy CPU side accesses (e.g., from Jit code, 3rd party plugins, libraries, etc.) to IO code/data would be unsuccessful given the same cryptographic separation semantics as above. Accordingly, IO side protections are provided from malicious/vulnerable CPU side accesses.

Note that in this example, no size/type/version-based tweaks for encryption of these IO pointers (and actual data) are used and thereby there is no protection between different IO allocations in the same address space (this is described further below). Moreover, if different tenants are sharing the same address space (e.g., browsers, databases, other compartmentalization use cases etc.), inter-tenant isolation can be achieved with tenant specific IO pointer encryption keys.

Figure 4:
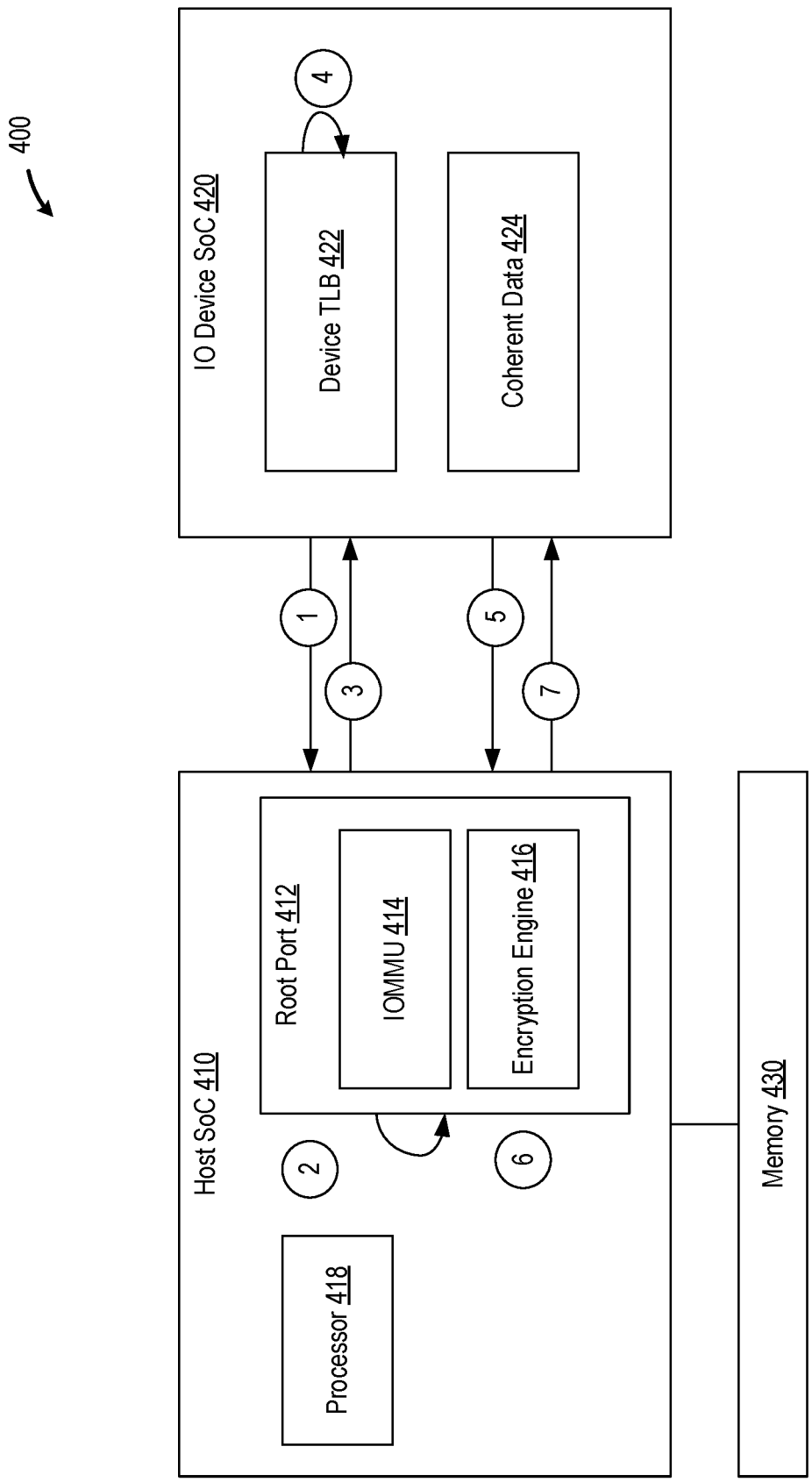
FIG. 4 illustrates a simplified block diagram of an example hardware configuration for providing IO device data encryption in accordance with certain embodiments.

FIG. 4 illustrates a simplified block diagram of an example hardware configuration 400 for providing IO device data encryption in accordance with certain embodiments. In the example hardware configuration 400, a host SoC 410 is coupled to an IO Device SoC 420 over an interconnect, such as a PCIe- or CXL-based interconnect. The host SoC 410 also includes a processor 418 and memory 419 (in which CPU data and/or IO data may be stored, e.g., as shown in FIG. 3). Each SoC may include other components than those shown. The host SoC 410 includes a root port 412, which may function similar to a root port of a PCIe root complex. The root port 412 includes an IOMMU 414, which may include a memory management unit (MMU) that connects a direct memory access (DMA)-capable I/O bus to the memory 419 of the host SoC 410, and an encryption engine 416, which may perform one or more encryption/decryption functions as described herein. For example, the encryption engine 416 may encrypt/decrypt the encrypted IO code/data 312 prior to storage/transmission (respectively) on the interconnect link between the host SoC 410 and IO device SoC 420. The IO Device SoC 420 includes a device TLB 422 and coherent data storage 424.

The example shown in FIG. 4 also illustrates an example flow of operations for a coarse-grained CC extension to IO side memory accesses, e.g., for the SVM scenario. The example flow shown and described below refers to the CXL.cache protocol (hence using PCIe Address Translation Services (ATS) protocol), but it will be understood that the underlying concepts may be utilized in other interconnect protocols. First, as part of command submission in the IO control paths (e.g., via regular MMIO or specific ENQCMD instructions), an Encrypted Virtual Address (EVA) is sent to the IO device SoC 420. The IO Device SoC 420 sends back the same EVA it received as part of data path DMA operations.

At (1) in FIG. 4, the IO device SoC 420 sends a translation request including the EVA via the PCIe ATS protocol to the root port 412 of the host SoC 410. The root port 412 then at (2) decrypts the EVA to a GVA using the encryption engine 416 (e.g., via a block cipher encryption/decryption scheme, such as the K-Cipher as disclosed in U.S. Patent Application Publication No. 2020/0145187 (entitled "Bit-Length Parameterizable Cipher") or another 32-bit lightweight block cipher). The root port 412 then locates the GVA in the IOMMU 414. In the case of a single IO pointer encryption key, the key may be securely generated on the CPU side and programmed on the IO side through memory mapped IO (MMIO) via new base address register (BAR) or even existing VT-d BAR (Virtualization Technology for Directed I/O). For multiple IO keys, e.g., per tenant or context keys, utilizing the existing device to context VT-d mapping, the IO key can be stored in a PASID (Process Address Space ID) table entry or referenced via a pointer in that entry (e.g., 1 per Domain ID). Before looking up IA page tables, a key may be obtained via the methods above and the pointer may be decrypted. A K-cipher-based pipe can be in the integrating IP as well (e.g., HIOP (host I/O processor)) and separate hardware microarchitecture may be are kept to store keys referenced by Requester ID (RID), PASID, exposed in dedicated BAR. For PCIe ATS, as part of the translation completion, the device may be extended to store the EVA+ returned HPA in the Device TLB 422 and the PCIe protocol may be extended on a translated path to send the EVA as part of same TLP payload using new or existing prefix bits to signify a valid EVA in the payload. This is because EVA is required for actual data encryption/decryption on the host side. Other VT-d extensions like storing EVAs in structures referenced from PASID table entries for pending translated (and thereby completed translations) requests can be done (indexed by GVA) and retrieved in translated path.

Next, the host physical address (HPA) is obtained on the host side, and at (3), the HPA is sent to the IO device SoC 420. For example, in the DMA path, either untranslated (after EVA decryption) or translated (in case of PCIe ATS), the HPA may be obtained/checked normally via IOTLB access/page walks. At (4), the IO device SoC 420 sends a read or write request using the obtained HPA. In response, the host SoC 410 decrypts data stored in host memory via the encryption engine 416 (e.g., via a block cipher, e.g., a 64-bit block cipher such as PRINCE, Galois/Counter Mode (GCM), or Gimli, or a bit-length parameterizable cipher such as the K-cipher), and transmits at (7) the decrypted data to the IO device SoC 420. For writes, the EVA may be stored in the IO input buffer entries and the data may be encrypted via the encryption engine 416 inline in IO path. For reads, the EVA may be additionally stored in an existing allocated completion buffer entry (with a unique tag carried through), which could be used in data decryption for completions. The same data encryption/decryption pipe may be shared on the read/write paths. The corresponding key can be shared with IO subsystem via secure MMIO.

In some embodiments, the encryption engine 416 may perform an integrity check on the decrypted data prior to transmission to the IO device SoC 420. For example, a message authentication code (MAC) or hash may be stored along with the encrypted data in memory. If the encrypted data is changed (e.g., by an adversary), the MAC will no longer match in an integrity check (e.g., via deterministic detection).

In the described embodiment, the IO device always receives/transmits unencrypted data over the interconnect, keeping device changes minimal (with changes only being made to EVA for PCIe ATS operations). Accessing memory attached to devices through the above path via peer-to-peer MMIO would work just as is, with encryption/decryption being performed on the DMA originating IO stack. The generic, scalable memory boundary extension to support any device attached system memory (e.g., CXL.mem protocol) without requiring SoC changes on every IO hardware stack.

In progression from the examples above, the following enforces intra-IO object memory access control with tweaks based on a size field, type field, version field, or another field in the pointer on corresponding buffer allocations. The corresponding IO allocation stack is enlightened with this tweak information, on top of tenant specific IO allocation keys as described above. As a result, memory safety issues like buffer overflow, dangling pointers/uses after free (UAFs) etc. within the IO code/kernels too (along with CPU side) are detected/prevented from causing exploits. If IO memory is allocated out of socket to attached DRAM, the same flow through enhanced SoC/IOMMU as described above with respect to FIGS. 3 and 4 may also apply to the examples described further below with respect to FIGS. 5 and 6.

Figure 5:
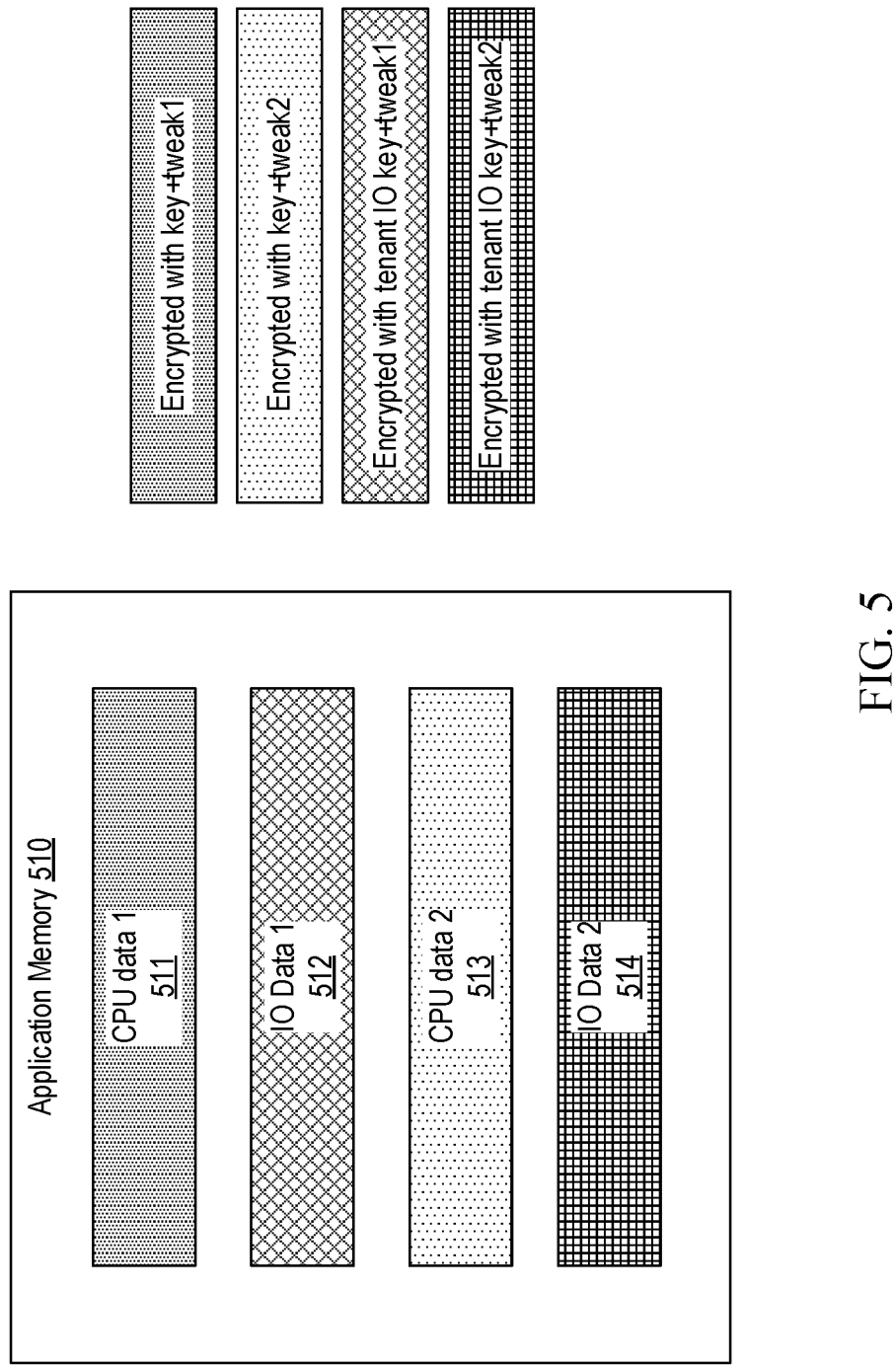
FIG. 5 illustrates yet another simplified block diagram of an application and data associated with various XPUs executing aspects of the application.

FIG. 5 illustrates yet another simplified block diagram of application memory 510 and data 511, 512, 513, 514 associated with various XPUs executing aspects of the application. In the example shown, the data 511, 513 are associated with a CPU of a host device, while the data 512, 514 are associated with code or data of an IO device connected to the host device. As shown, each of the data 511, 513 are encrypted when in memory 510, with each being encrypted with different key/tweak pairs (e.g., with context-specific pointer tweaks/keys) as shown. The encryption of data 511, 513 may be performed in accordance with cryptographic computing embodiments disclosed herein and in U.S. Pat. No. 9,436,847 (entitled "Cryptographic pointer address encoding") and/or U.S. Patent Application Publication No. 2020/0125501 (entitled "Pointer Based Data Encryption"). The data 512, 514 are also encrypted when stored in memory 510 using respective tenant IO key/tweak pairs. The tenant IO keys may be different from the key(s) used by the CPU via CC enlightened libraries.

Figure 6:
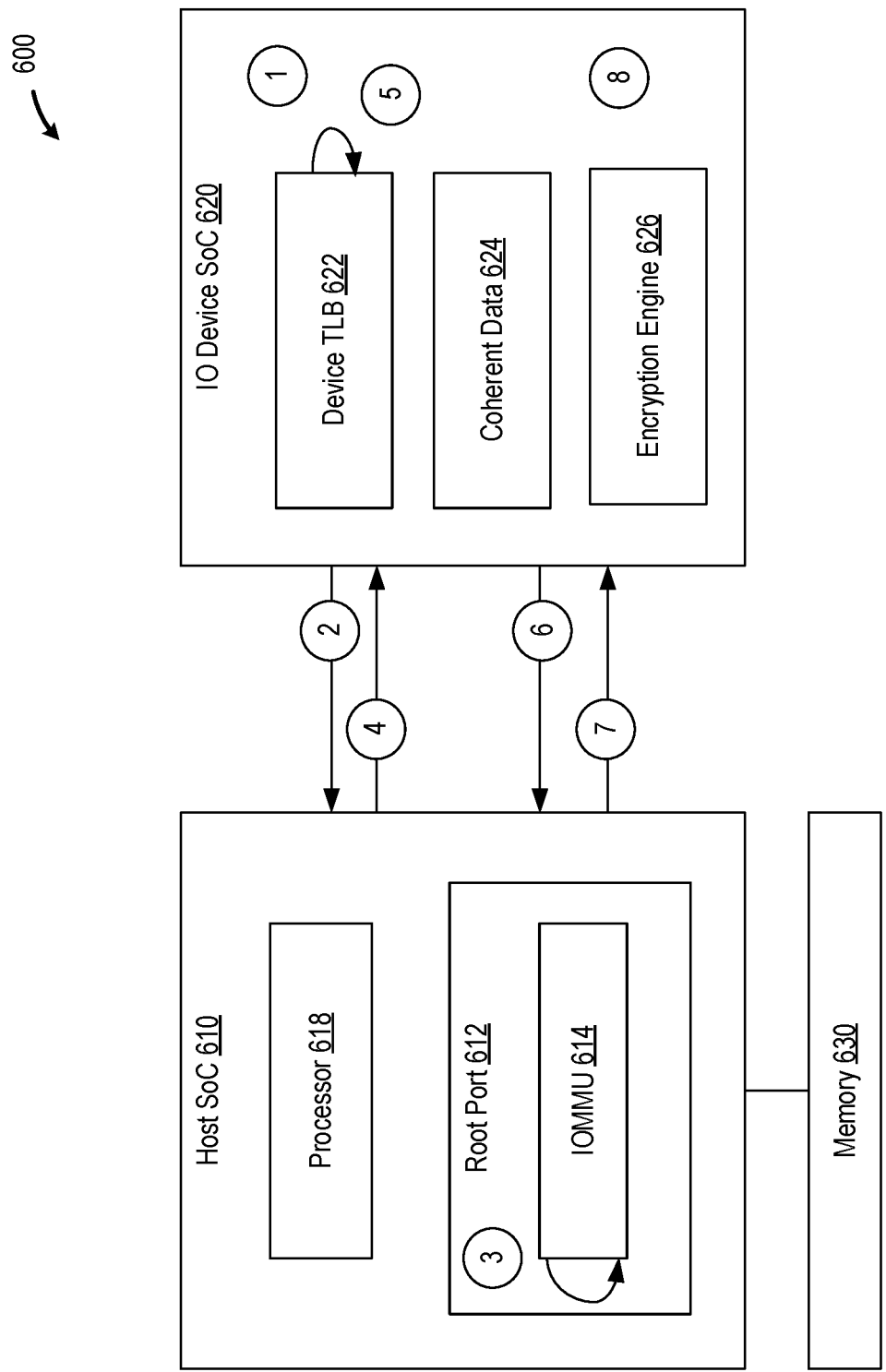
FIG. 6 illustrates a simplified block diagram of another example hardware configuration for providing IO device data encryption in accordance with certain embodiments.

FIG. 6 illustrates a simplified block diagram of another example hardware configuration 600 for providing IO device data encryption in accordance with certain embodiments. In the example hardware configuration 600, a host SoC 610 is coupled to an IO Device SoC 620 over an interconnect, such as a PCIe- or CXL-based interconnect. The host SoC 610 also includes a processor 618 and memory 619 (in which CPU data and/or IO data may be stored, e.g., as shown in FIG. 5). Each SoC may include other components than those shown. The host SoC 610 includes a root port 612, which may function similar to a root port of a PCIe root complex. The root port 612 includes an IOMMU 614, which may include a memory management unit (MMU) that connects a direct memory access (DMA)-capable I/O bus to the memory 619 of the host SoC 410. Here, the IO device SoC 620 includes an encryption engine 616, which may perform one or more encryption/decryption functions as described herein. For example, the encryption engine 616 may encrypt/decrypt the encrypted IO code/data 512, 514 prior to transmission on the interconnect to the host SoC 610. The IO Device SoC 420 also includes a device TLB 622 and coherent data storage 624.

In comparison with Implementation 2, the encryption engine described above located on the SoC IO subsystem is absorbed within the IO device/accelerator. The most generic case of devices getting back HPA after PCIe ATS protocol and using that to access any system memory is shown in the above FIG. This device encompassed CC H/W enlightenments prevents the need of supporting hardware changes on every IO subsystem stack in the SoC (ideally no SoC changes). Here IO S/W stack sends Encrypted Virtual Address (EVA) to the device in the control path. The specific IO pointer encryption key/s are shared with the device via PCIe Secure Protocol & Data Model (SPDM) flows or via normal MMIO (links protected using PCIe/CXL IDE link encryption) in the command submission control path. For multiple keys, the control path host/guest S/W and device needs to follow some protocol to synchronize (e.g., share/notify key change for tenant change in submission path). This could be done via new messages in the Device Interface Management Protocol (DIMP), which is being standardized as part of trusted device requirements.

At (1) in FIG. 6, the IO device SoC 620 decrypts an EVA to obtain a GVA, and may also store the original EVA tweak (e.g., a portion of the EVA, such as upper bits of the EVA, including one or more of a size field, version field, type field, etc.) in an entry of the Device TLB 622. At (2), the IO device SoC 620 sends a translation request with the GVA to the host SoC 610. The host SoC 610 obtains a HPA after translation through system IOMMU 614 in the root port 612 (or via a device page walker in some instances) and sends the HPA back to the IO device SoC 620 at (4). At (5), the IO device SoC 620 stores the HPA, and at (6) the IO device SoC 620 sends a read/write request to the host SoC 610 using the HPA to access data in the memory 619 (which may be in the host SoC 610 as shown or coupled to the host SoC 610 in another manner, e.g., through a device attached to the host SoC 610, e.g., using a CXL.mem protocol).

For writes, the IO device SoC 620 encrypts the data to be written using the encryption engine 626. The encryption engine 626 may encrypt the data with an EVA-based counter stream. For reads, the IO device SoC 620 is responsible for IO data decryption (in contrast with Implementation 2 above). A key for encrypting/decrypting the IO data (e.g., a 64-bit cipher such as PRINCE, Galois/Counter Mode (GCM), or Gimli, or a bit-length parameterizable cipher such as the K-cipher) can also be shared with IO device SoC 620 via a secure channel established, e.g., via PCIe/MCTP SPDM (Management Component Transport Protocol, Security Protocol and Data Model, respectively) 1.1 protocols. Thus, all CC cryptographic operations may be self-contained inside the IO device and will not depend on specific host SoC capabilities. From a device hardware architecture perspective, the IDE (Integrity and Data Encryption) PCIe/CXL link encryption engine 626 could be extended to support the data path encryption/decryption in the IO device. Through this scalable extension, any system memory (e.g., on a platform, and may be accessed by CXL.mem protocols) can be supported with CC semantics for IO.

In some embodiments, aspects of Implementation 2 and Implementation 3 may be combined in a system. For instance, some IO devices might not have the configurations described with respect to Implementation 3 (e.g., an on-board encryption engine such as encryption engine 626) and may utilize a host SoC encryption engine for CC operations, e.g., as described above with respect to Implementation 2. In such instances, VT-d tables may be extended to indicate requirements of system support for CC during page walks (in which a virtual address may be treated as an EVA). In some cases, the IO device can notify the host SoC of its CC capabilities/requirements in encoded TLP prefix bits (e.g., as described above with respect to Implementation 2). Other model-specific system level solutions can be adopted as well, such as the IOMMU having a microarchitecture table with a list of incoming devices/BDFs (Bus:Device.Function) where no need of additional CC operations as applicable.

Finally, for local memory attached to IO devices (e.g., not exposed in the system address space) and managed by the host SoC/device driver, analogous device side changes can be implemented to support fine-grained CC protections for all local allocations in that memory.

Disaggregated Memory Extensions for Cryptographic Computing

In addition to the I/O extensions described above, aspects of the present disclosure may extend CC-based memory security and protection to disaggregated platforms that include memory from which either core or IO side code/data (e.g., the data shown in FIGS. 3 and 5) are allocated in remote locations (e.g., racks or nodes across a datacenter or cloud environment). Typically, the scale-out fabric in cloud environments is the network, and Remote Direct Memory Access (RDMA)-capable NICs provide a way for a local node to access memory on other nodes in the environment. Thus, certain aspects herein are described with respect to RDMA protocols and associated hardware (e.g., RDMA network interface cards (NICs)). RDMA NICs may be located inside other accelerators or Infrastructure Processing Units (IPUs), as described herein. However, it will be understood that the same or similar concepts described herein may apply to other scale-out fabrics or protocols, such as, for example, Infiniband™ or GenZ™.

For example, in certain embodiments, a software stack or application running on a host processor/SoC can securely offload CC-protected data to devices (e.g., remote SoCs) over a network for remote storage. That is, a software stack or application on the host SoC can be assigned memory from DDR on the remote device or remote DDR coupled to an IO device. Host core or IO side access for an application to the remote DDR could be over RDMA in one example scenario. RDMA may offer certain advantages of direct user space set up and access, no bounce buffer, easier transport offload to hardware, as well as other advantages. The software stack/application may be made aware of the remote device memory availability by a resource manager or by other means. In some instances, the host can offload the CC-based computations (e.g., encryption/decryption functions or other CC-mechanisms) to the remote devices/SoCs as well. The offload can be based on device capabilities, such as relative processing powers between the host and remote devices (e.g., number or type of processors (CPU vs. GPU)), load balancing (e.g., where the host is bottlenecked), trustworthiness of the remote device based on a geolocation, or for other reasons. In some instances, the host can offload the CC-based computations to a smart NIC coupled to the host. In other instances, the host can offload the CC-based computations to the remote device or smart NIC coupled to the remote device, e.g., where such devices are within a trusted compute boundary (TCB) of the host. The data may be shared among the host and remote device via RDMA-based protocols, e.g., RDMA over Converged Ethernet (RoCE), Internet Wide Area RDMA Protocol (IWARP), or Infiniband.

Figure 7:
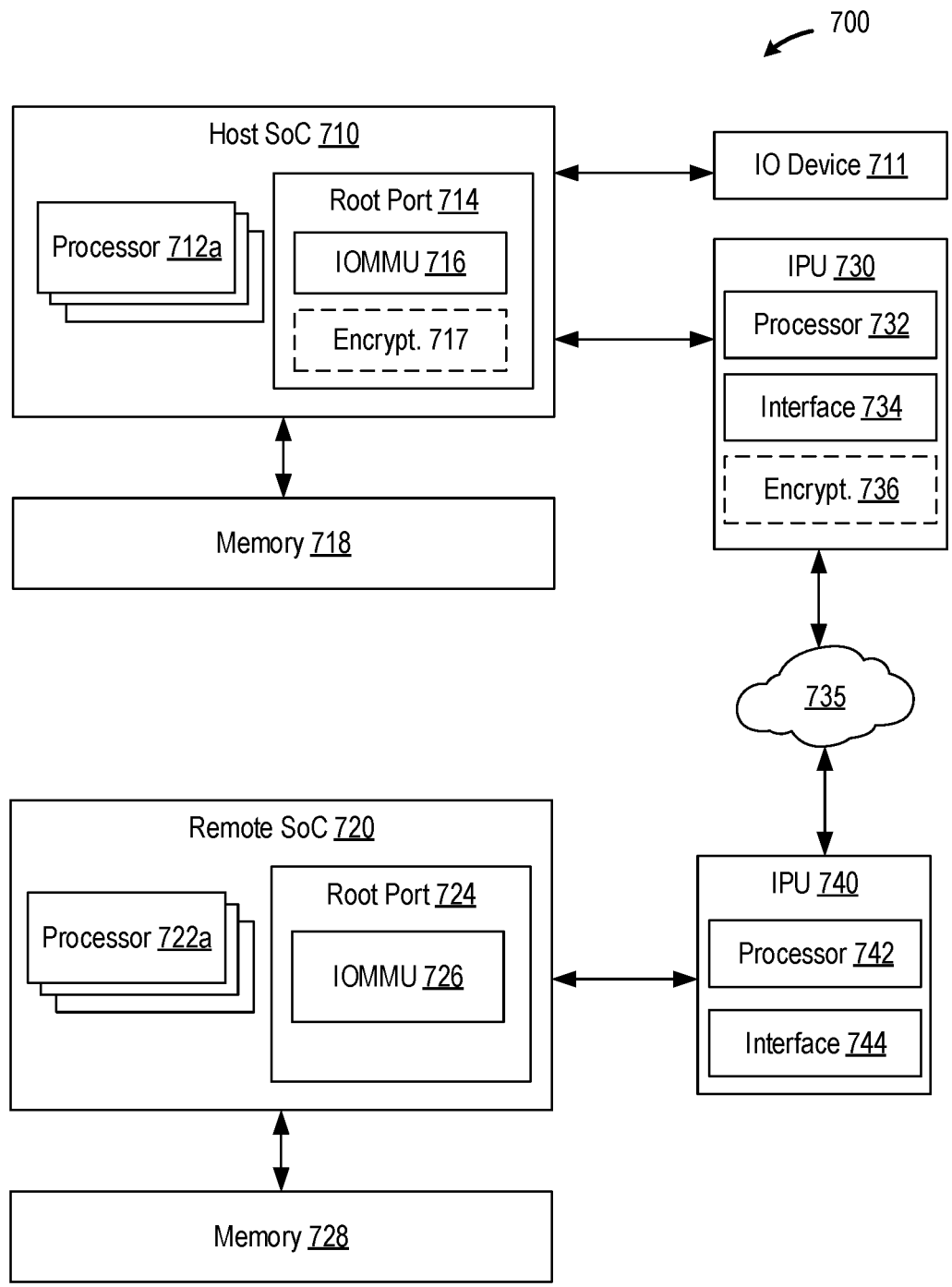
FIG. 7 illustrates an example computing environment in which CC-based protections may be extended to disaggregated memory in accordance with certain embodiments.
Figure 8:
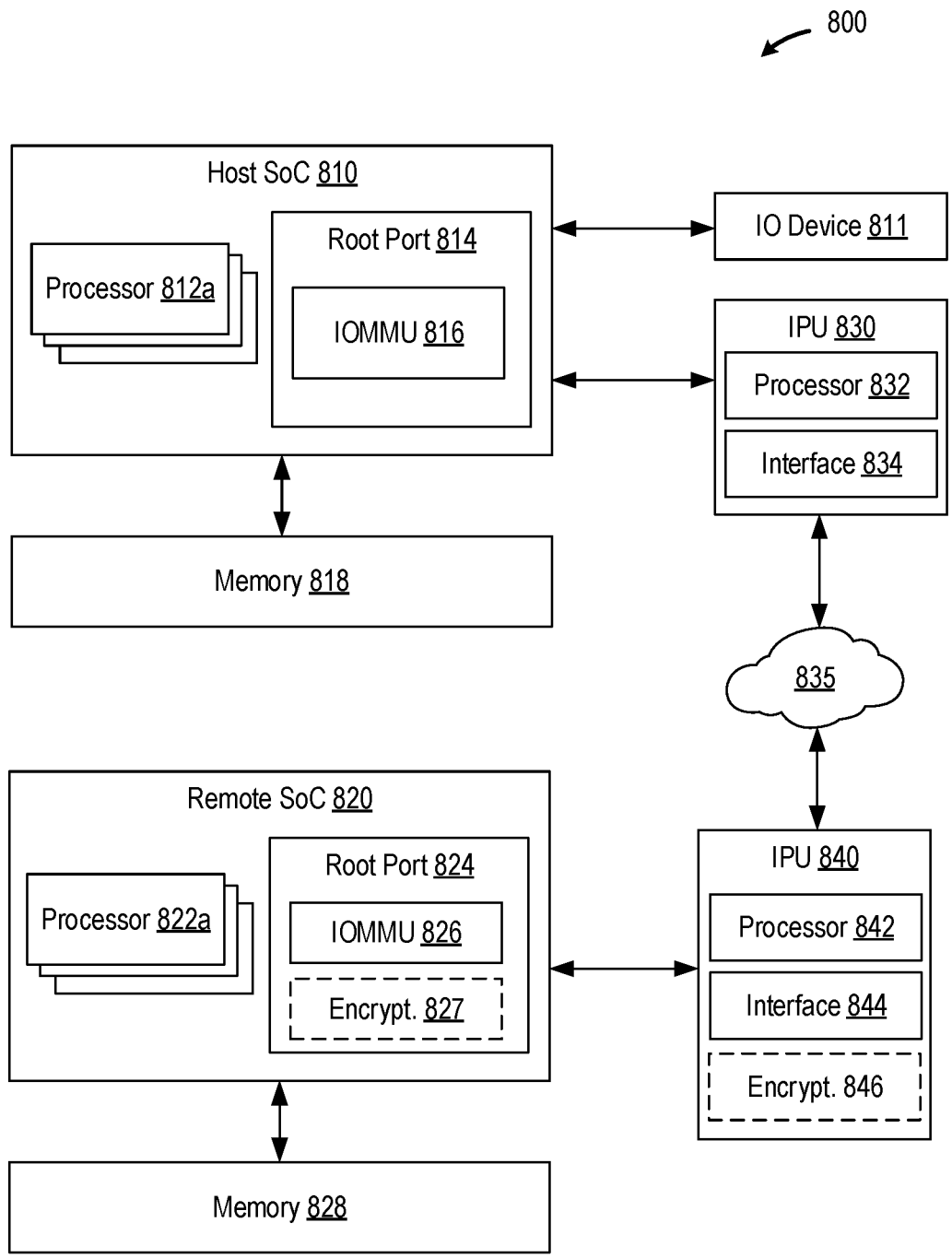
FIG. 8 illustrates another example computing environment in which CC-based protections may be extended to disaggregated memory in accordance with certain embodiments.

FIGS. 7-8 illustrate example computing environments 700, 800 in which CC-based protections may be extended to disaggregated memory in accordance with certain embodiments. In each example shown, the respective computing environment includes a host system-on-chip (SoC) (e.g., 710, 710) that includes a number of processors (e.g., 712, 812) and a root port (e.g., 714, 814) which may function similar to a root port of a PCIe root complex. The root ports include an input/output memory management unit (IOMMU) (e.g., 714, 814), which may include a memory management unit (MMU) that connects a direct memory access (DMA)-capable I/O bus to the memory (e.g., 718, 818) coupled to the host SoC. The memory (e.g., 718, 818) may be implemented as DDR memory in certain embodiments. The root ports provide a connection between the processors (e.g., 712, 812) and input/output (IO or I/O) devices (e.g., IO devices 711, 811 or IPUs 730, 730) via an IO interconnect protocol. The interconnect protocol may implement a Peripheral Component Interconnect Express (PCIe)-based and/or Compute Express Link (CXL)-based interconnect protocol.

The host SoC is coupled to a remote SoC (e.g., 720, 820) over a network (e.g., 735, 835). The network (e.g., 735, 835) may be a TCP/IP network, in some embodiments. The remote SoC includes one or more processors (e.g., 722, 822) and a root port (e.g., 724, 824) with an IOMMU (e.g., 726, 826), similar to the host SoC. The host and remote SoC are coupled over the network via respective IPUs (e.g., 730, 830 and 740, 840, respectively). In some embodiments, the IPUs may be smart NICs, e.g., the IPUs may include a processor (e.g., 732, 742, 832, 842) in addition to a network interface (e.g., 734, 744, 834, 844), such that the IPU may perform one or more compute functions (e.g., encryption/decryption). As described above, an application that is running on the host SoC or an IO device coupled to the host SoC (e.g., IO device 711 or 811) may be assigned (or may otherwise be able to access) memory (e.g., DDR memory) coupled to the remote SoC (e.g., memory 728, 828). Together, the host SoC 710, IO device 711, IPU 730 and memory 718 may be referred to as a host node, while the remote SoC 720, IPU 740 and memory 728 may be referred to as a remote node.

In the example shown in FIG. 7, an encryption engine (e.g., 717, 736) is included in one or more of the root port 714 of the host SoC 710 and IPU 730 coupled to the host SoC 710 to perform encryption/decryption operations on data that is to be stored remotely. Thus, in the example shown, CC-based encryption may be performed on data to be stored remotely prior to the data being transmitted over the network 835. In this way, any data traversing the network 735 is encrypted and may not be accessed by the remote SoC or any other device with access to network traffic. This may be useful in scenarios when a remote SoC is not within the TCB of the host SoC, but may also be used when the remote and host SoCs are within the same TCB.

In contrast, in the example shown in FIG. 8, an encryption engine (e.g., 827, 846) is included in one or more of the root port 824 of the remote SoC 820 and IPU 840 coupled to the remote SoC 820 to perform the encryption/decryption operations on data from the host SoC 810 (to be stored in memory 828). Thus, in the example shown in FIG. 8, the host SoC 810 may offload the encrypt/decrypt CC operations to one of the remote encryption engines 827, 846. This may be useful, for example, in scenarios when a remote SoC is within the TCB of the host SoC and the host SoC is not CC-capable (i.e., does not include an encryption engine as shown in FIG. 7). An advantage of having the remote SoC 820 within the TCB is that, in addition to allocating memory on the remote SoC 820, the host SoC 810 can also offload memory computations on the encrypted data to the remote SoC 820. This enables better resource utilization and balancing between all the nodes in the cloud environment.

Although two specific examples are shown in FIGS. 7-8, aspects of each example may be combined in certain embodiments. For example, a host SoC may include an encryption engine as shown in FIG. 7, but may offload encrypt/decrypt operations to an encryption engine located in a remote SoC or IPU, e.g., for load balancing or other purposes. In any scenario, the software stack/application running on the host SoC may be aware of the CC capabilities of each device and may accordingly determine which device is to perform the CC-based encryption/decryption for remote data storage. For example, the host software stack may command its CC-enabled IPU to perform the encryption operations (e.g., via an ENQCMD and MMIO command) prior to sending the data over the network, or may perform some attestation/configuration with the remote SoC (e.g., as described further below) so that it performs the encryption operations on the remotely stored data.

Figure 9:
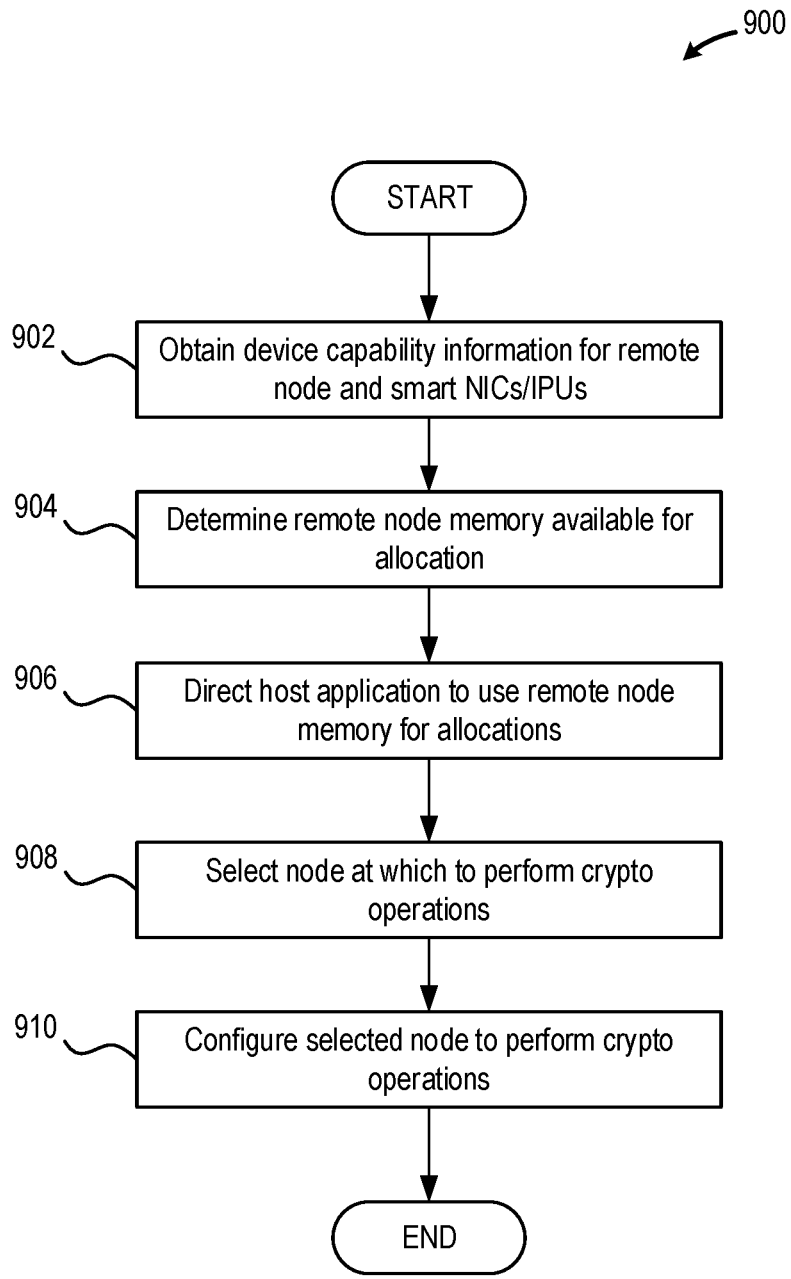
FIG. 9 illustrates a flow diagram of an example process for extending CC-based protections to disaggregated memory in accordance with certain embodiments.

FIG. 9 illustrates a flow diagram of an example process 900 for extending CC-based protections to disaggregated memory in accordance with certain embodiments. The example process may be implemented in software, firmware, hardware, or a combination thereof. For example, in some embodiments, operations in the example process shown in FIG. 9 may be performed by circuitry of a host node performing memory allocations (e.g., host SoC 710, 810 of FIGS. 7-8). In some embodiments, a computer-readable medium may be encoded with instructions that implement one or more of the operations in the example process below. The example process may include additional or different operations, and the operations may be performed in the order shown or in another order. In some cases, one or more of the operations shown in FIG. 9 are implemented as processes that include multiple operations, sub-processes, or other types of routines. In some cases, operations can be combined, performed in another order, performed in parallel, iterated, or otherwise repeated or performed another manner.

At 902, a software stack (e.g., resource manager or orchestration layer stack of a cloud system) executing on a host node (e.g., host SoC 710 or 810) obtains device capability information for a remote node (e.g., remote SoC 720 or 820). The software stack may also obtain device capability information for smart NICs/IPUs of the host node and/or the remote node (e.g., IPUs 730, 740). In some instances, an RDMA software stack (e.g., VERBS API library), SoC CC crypto driver, IPU/NIC driver may be enlightened to communicate the capability information as part of a hardware set up/configuration and/or a command submission via the Queue Pairs. The CC hardware on the SoC and/or IPU may be configured to interpret these software directives and perform actions accordingly as described below. This flow would work well if the resource manager/orchestration stack is in host application TCB. If not, however, the software may first verify the authenticity of the remote platform and perform some attestation (e.g., like it would do for host platform authenticity/origin as well). This could be based on a public key signature and challenge-response based protocol.

At 904, the software stack determines that there is memory availability in the remote node and may accordingly direct a host application running on the host node to use such memory for allocations at 906. The stack may pass on the device capability information obtained at 902 to the host application, e.g., in the form of a manifest. The manifest may be enhanced with CC-relevant information as described above, e.g., device hardware capabilities, geolocation (e.g., from remote IPU IP address), SoC manufacturer (e.g., Intel vs. non-Intel SoC), etc.

At 908, the host application selects a node at which to perform the CC-based crypto operations. For example, if the capability information is not available for the remote node, or the application decides that the remote node is outside the TCB, then the host node hardware may be chosen to perform the cryptographic operations. The host node hardware may also be chosen to perform the cryptographic operations as a default, in certain embodiments. Alternatively, if the host node and/or IPU are limited in their CC capabilities (e.g., cannot perform such operations/do not have an encryption engine, as shown in FIG. 8), then application data can be bypassed to/from the host, and the crypto operations may be performed on the remote node (either via the remote IPU or remote SoC) for corresponding read/writes. If both platforms are CC-capable, then the software stack on the host node can enforce dynamic policies for load balancing. For example, the software stack may interact with the host application and corresponding RDMA stack/drivers to dynamically switch the CC crypto responsibilities between devices based on current processing workloads, IO traffic from other contexts, power states, etc. in the host and/or remote device.

At 910, the selected node(s) is configured to perform the CC-based crypto operations. For example, an SoC-based encryption engine (e.g., 717, 827) may have configuration information (which may be set via memory mapped input/output (MMIO) commands by a corresponding driver on the host/remote) to indicate a current mode (i.e., whether it should encrypt/decrypt for writes/reads or to bypass encryption). The host application may communicate with drivers to configure this current mode information. For multiple host <-> remote active IO contexts, this mode could be per context (e.g., BDF or PASID of host RDMA NIC/IPU) in the hardware. For CC enlightened IPUs/RDMA NICs, existing Translation Protection Tables (which are used for configuring STAG for every Memory Window) can be extended with 1 additional bit per entry, which may be configured by the IPU driver on the host or remote platform as applicable. Similar to the scenario above, the host application would communicate with the IPU driver to set/disable this bit. This would interact with the data encryption/decryption engine inside the device to either bypass or encrypt/decrypt traffic for that particular logical memory window.

In some instances, the intent for RDMA NICs/IPUs to perform the CC crypto operations may be embedded as part of the command submission itself in the corresponding queue. For example, the NIC may read a descriptor and know which mode (encrypt/decrypt or bypass) to use. This could be useful, for example, in the case of multiple contexts doing CC remote memory accesses at fine grained memory object level in use cases like containers, Function-as-a-Service (Faas), etc.

In the event that a remote SoC/IPU is to perform the encryption/decryption operations, the data encryption/decryption key may be passed via a secure channel setup between the remote and host, and the remote SoC/IPU driver may configure it on the remote hardware. The secure channel setup can be based on attestation/authentication protocols. The corresponding encrypted virtual address may be configured on the remote NIC side for the corresponding memory window to use for encryption/decryption of data.

Figure 10:
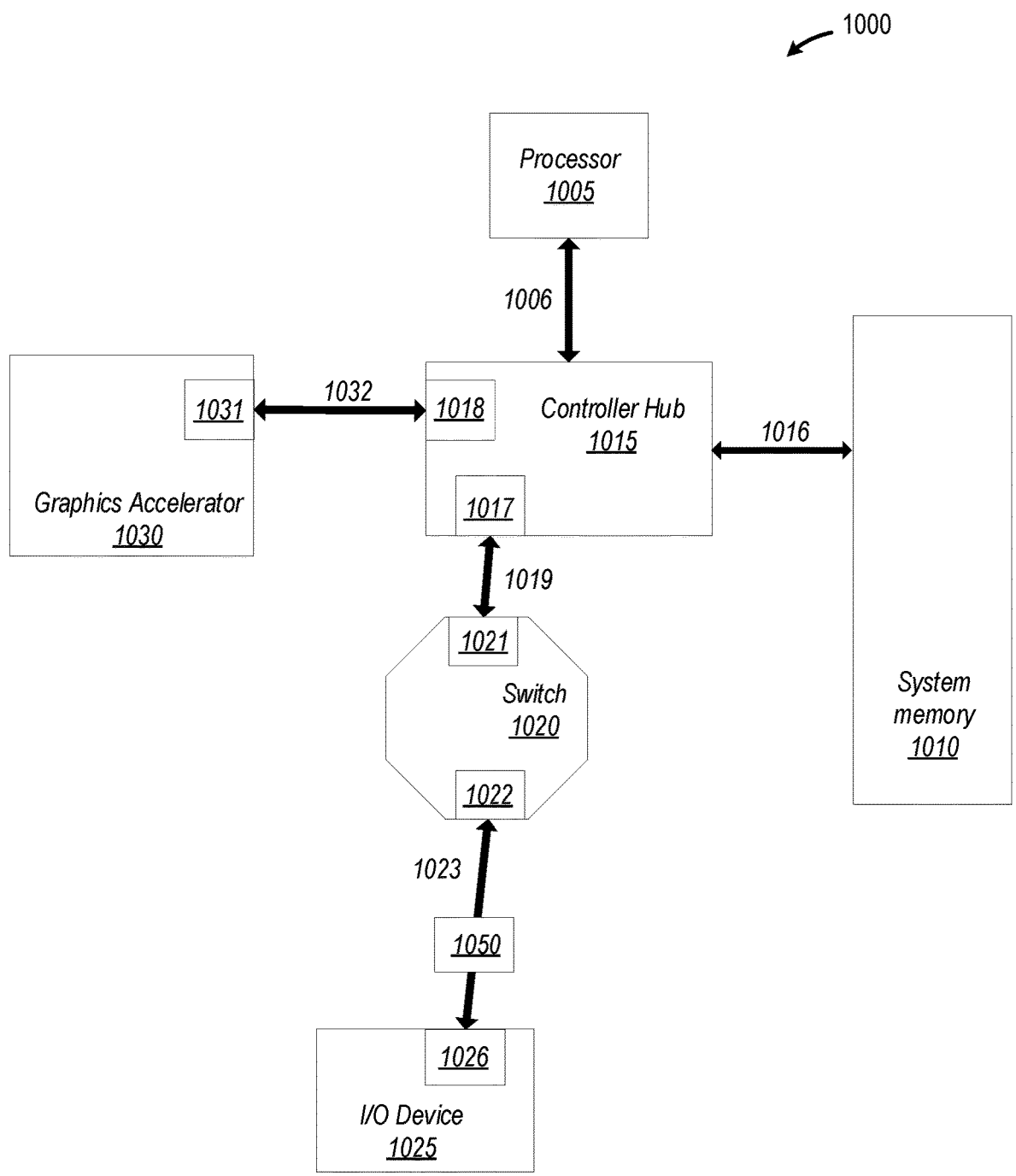
FIG. 10 illustrates an embodiment of a computing system including an interconnect architecture.

FIGS. 10-13 illustrate example interconnect embodiments in which aspects of the present disclosure may be incorporated. Referring to FIG. 10, an embodiment of a fabric composed of point-to-point Links that interconnect a set of components is illustrated. System 1000 includes processor 1005 and system memory 1010 coupled to controller hub 1015. Processor 1005 includes any processing element, such as a microprocessor, a host processor, an embedded processor, a co-processor, or other processor. Processor 1005 is coupled to controller hub 1015 through front-side bus (FSB) 1006. In one embodiment, FSB 1006 is a serial point-to-point interconnect as described below. In another embodiment, link 1006 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 1010 includes any memory device, such as random access memory (RAM), non-volatile (NV) memory, or other memory accessible by devices in system 1000. System memory 1010 is coupled to controller hub 1015 through memory interface 1016. Examples of a memory interface include a double-data rate (DDR) memory interface, a dual-channel DDR memory interface, and a dynamic RAM (DRAM) memory interface.

In one embodiment, controller hub 1015 is a root hub, root complex, or root controller in a Peripheral Component Interconnect Express (PCIe or PCIE) interconnection hierarchy. Examples of controller hub 1015 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 1005, while controller 1015 is to communicate with I/O devices, in a similar manner as described below. In some embodiments, peer-to-peer routing is optionally supported through root complex 1015.

Here, controller hub 1015 is coupled to switch/bridge 1020 through serial link 1019. Input/output modules 1017 and 1021, which may also be referred to as interfaces/ports 1017 and 1021, include/implement a layered protocol stack to provide communication between controller hub 1015 and switch 1020. In one embodiment, multiple devices are capable of being coupled to switch 1020.

Switch/bridge 1020 routes packets/messages from device 1025 upstream, i.e. up a hierarchy towards a root complex, to controller hub 1015 and downstream, i.e. down a hierarchy away from a root controller, from processor 1005 or system memory 1010 to device 1025. Switch 1020, in one embodiment, is referred to as a logical assembly of multiple virtual PCI-to-PCI bridge devices. Device 1025 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 1025 may include a PCIe to PCI/PCI-X bridge to support legacy or other version PCI devices. Endpoint devices in PCIe are often classified as legacy, PCIe, or root complex integrated endpoints.

Graphics accelerator 1030 is also coupled to controller hub 1015 through serial link 1032. In one embodiment, graphics accelerator 1030 is coupled to an MCH, which is coupled to an ICH. Switch 1020, and accordingly I/O device 1025, is then coupled to the ICH. I/O modules 1031 and 1018 are also to implement a layered protocol stack to communicate between graphics accelerator 1030 and controller hub 1015. Similar to the MCH discussion above, a graphics controller or the graphics accelerator 1030 itself may be integrated in processor 1005. Further, one or more links (e.g., 1023) of the system can include one or more extension devices (e.g., 1050), such as retimers, repeaters, etc.

Figure 11:
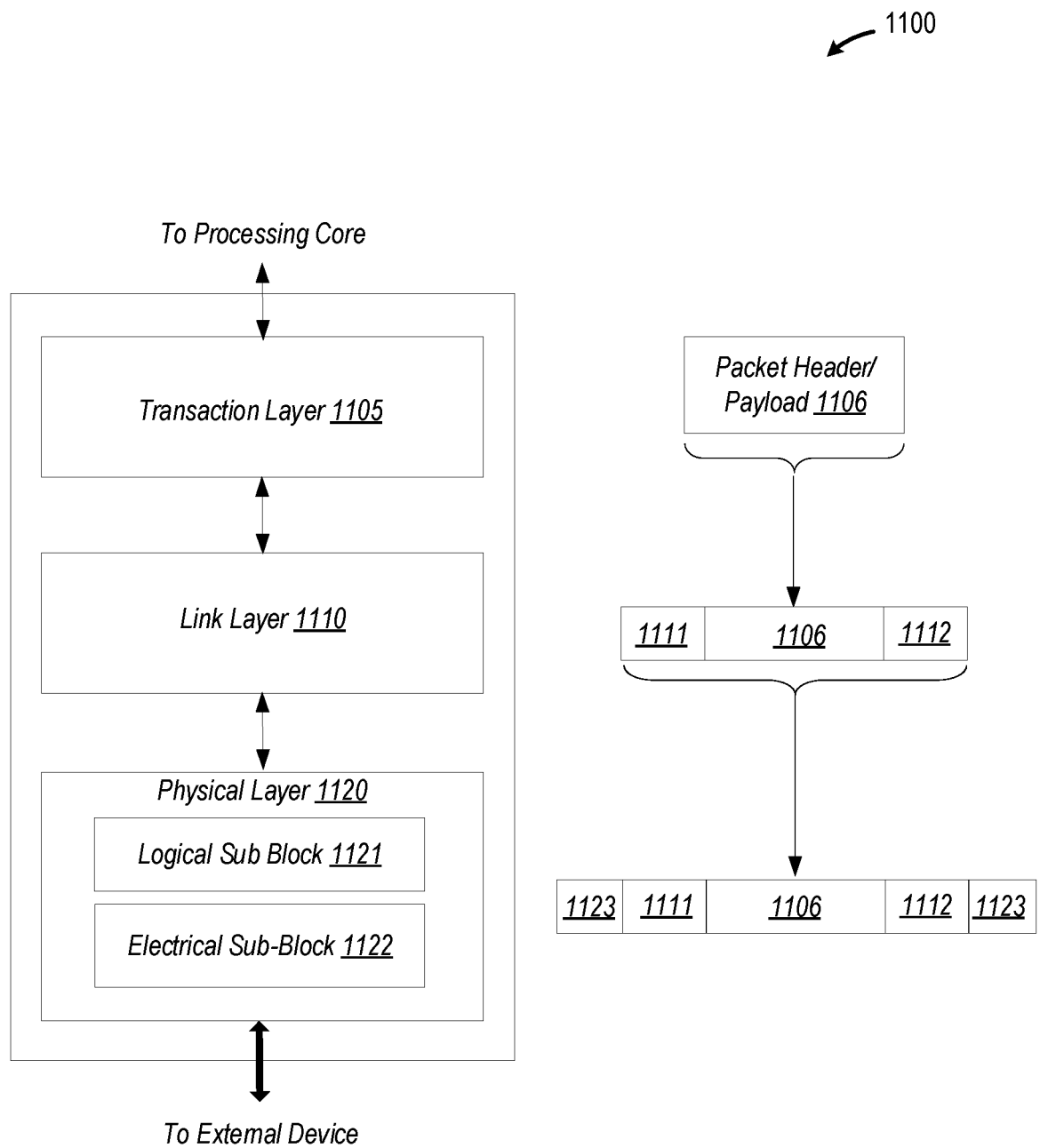
FIG. 11 illustrates an embodiment of an interconnect architecture including a layered stack.

Turning to FIG. 11 an embodiment of a layered protocol stack is illustrated. Layered protocol stack 1100 includes any form of a layered communication stack, such as a Quick Path Interconnect (QPI) stack, a PCIe stack, a next generation high performance computing interconnect stack, or other layered stack. Although the discussion below relates to a PCIe stack, the same concepts may be applied to other interconnect stacks. In one embodiment, protocol stack 1100 is a PCIe protocol stack including transaction layer 1105, link layer 1110, and physical layer 1120. An interface, such as interfaces 1017, 1018, 1021, 1022, 1026, and 1031 in FIG. 10, may be represented as communication protocol stack 1100. Representation as a communication protocol stack may also be referred to as a module or interface implementing/including a protocol stack.

PCI Express uses packets to communicate information between components. Packets are formed in the Transaction Layer 1105 and Data Link Layer 1110 to carry the information from the transmitting component to the receiving component. As the transmitted packets flow through the other layers, they are extended with additional information necessary to handle packets at those layers. At the receiving side the reverse process occurs and packets get transformed from their Physical Layer 1120 representation to the Data Link Layer 1110 representation and finally (for Transaction Layer Packets) to the form that can be processed by the Transaction Layer 1105 of the receiving device.

Transaction Layer

In one embodiment, transaction layer 1105 is to provide an interface between a device's processing core and the interconnect architecture, such as data link layer 1110 and physical layer 1120. In this regard, a primary responsibility of the transaction layer 1105 is the assembly and disassembly of packets (i.e., transaction layer packets, or TLPs). The translation layer 1105 typically manages credit-base flow control for TLPs. PCIe implements split transactions, i.e., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 1105. An external device at the opposite end of the link, such as controller hub 1015 in FIG. 10, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1105 assembles packet header/payload 1106. Format for current packet headers/payloads may be found in the PCIe specification at the PCIe specification website.

Link Layer

Link layer 1110, also referred to as data link layer 1110, acts as an intermediate stage between transaction layer 1105 and the physical layer 1120. In one embodiment, a responsibility of the data link layer 1110 is providing a reliable mechanism for exchanging Transaction Layer Packets (TLPs) between two components a link. One side of the Data Link Layer 1110 accepts TLPs assembled by the Transaction Layer 1105, applies packet sequence identifier 1111, i.e. an identification number or packet number, calculates and applies an error detection code, i.e. CRC 1112, and submits the modified TLPs to the Physical Layer 1120 for transmission across a physical to an external device.

Physical Layer

In one embodiment, physical layer 1120 includes logical sub block 1121 and electrical sub-block 1122 to physically transmit a packet to an external device. Here, logical sub-block 1121 is responsible for the "digital" functions of Physical Layer 1121. In this regard, the logical sub-block includes a transmit section to prepare outgoing information for transmission by physical sub-block 1122, and a receiver section to identify and prepare received information before passing it to the Link Layer 1110.

Physical block 1122 includes a transmitter and a receiver. The transmitter is supplied by logical sub-block 1121 with symbols, which the transmitter serializes and transmits onto to an external device. The receiver is supplied with serialized symbols from an external device and transforms the received signals into a bit-stream. The bit-stream is de-serialized and supplied to logical sub-block 1121. In one embodiment, an 8b/10b transmission code is employed, where ten-bit symbols are transmitted/received. Here, special symbols are used to frame a packet with frames 1123. In addition, in one example, the receiver also provides a symbol clock recovered from the incoming serial stream.

As stated above, although transaction layer 1105, link layer 1110, and physical layer 1120 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

A variety of other interconnect architectures and protocols may utilize the concepts discussed herein. In one example, Compute Express Link (CXL) may be used. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples).

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 12:
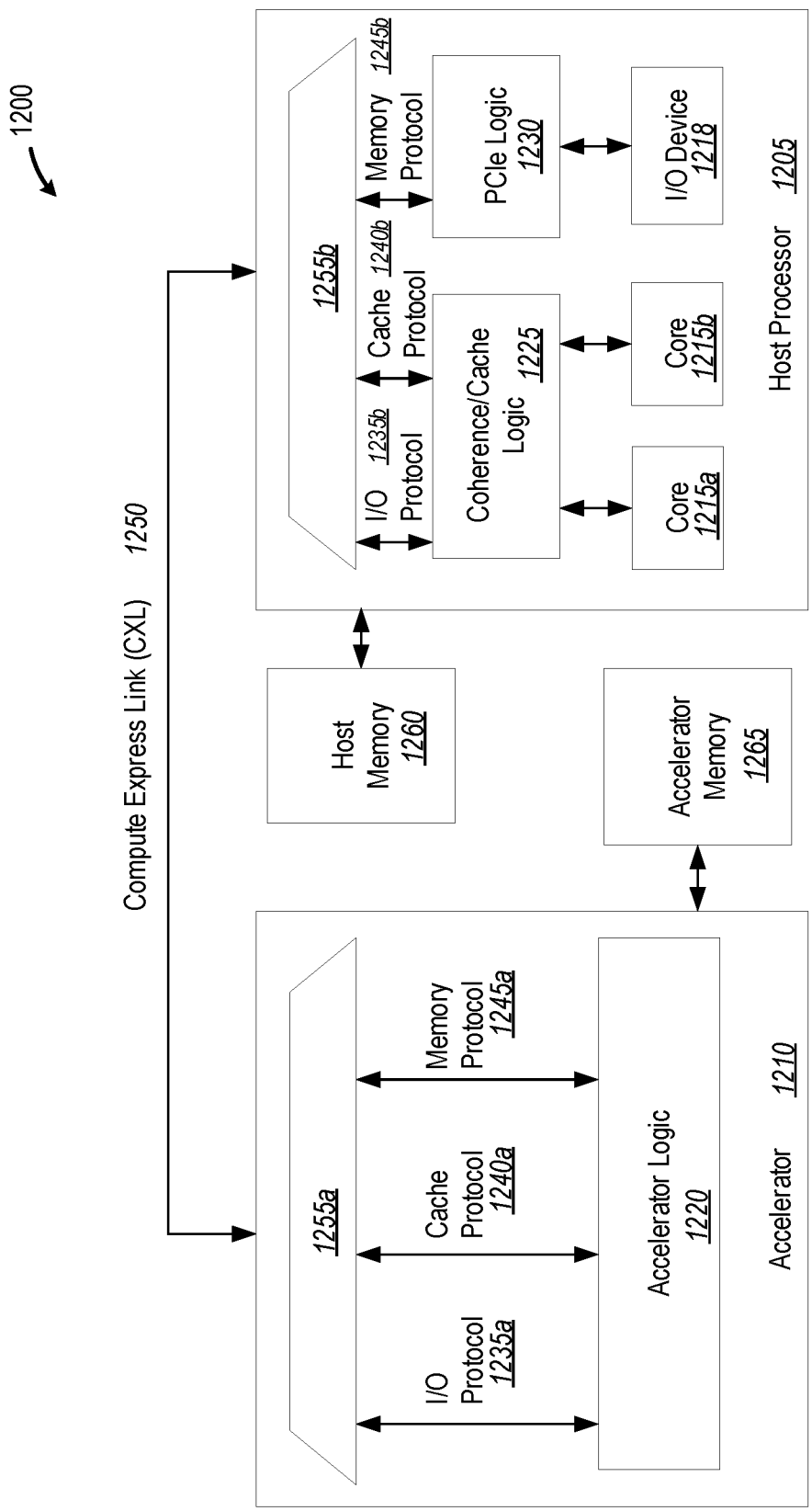
FIG. 12 illustrates a simplified block diagram is shown illustrating an example system utilizing a CXL link.

Turning to FIG. 12, a simplified block diagram 1200 is shown illustrating an example system utilizing a CXL link 1250. For instance, the link 1250 may interconnect a host processor 1205 (e.g., CPU) to an accelerator device 1210. In this example, the host processor 1205 includes one or more processor cores (e.g., 1215*a-b*) and one or more I/O devices (e.g., 1218). Host memory (e.g., 1260) may be provided with the host processor (e.g., on the same package or die). The accelerator device 1210 may include accelerator logic 1220 and, in some implementations, may include its own memory (e.g., accelerator memory 1265). In this example, the host processor 1205 may include circuitry to implement coherence/cache logic 1225 and interconnect logic (e.g., PCIe logic 1230). CXL multiplexing logic (e.g., 1255*a-b*) may also be provided to enable multiplexing of CXL protocols (e.g., I/O protocol 1235*a-b* (e.g., CXL.io), caching protocol 1240*a-b* (e.g., CXL.cache), and memory access protocol 1245*a-b* (CXL.mem)), thereby enabling data of any one of the supported protocols (e.g., 1235*a-b*, 1240*a-b*, 1245*a-b*) to be sent, in a multiplexed manner, over the link 1250 between host processor 1205 and accelerator device 1210.

In some implementations, a Flex Bus™ port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 13:
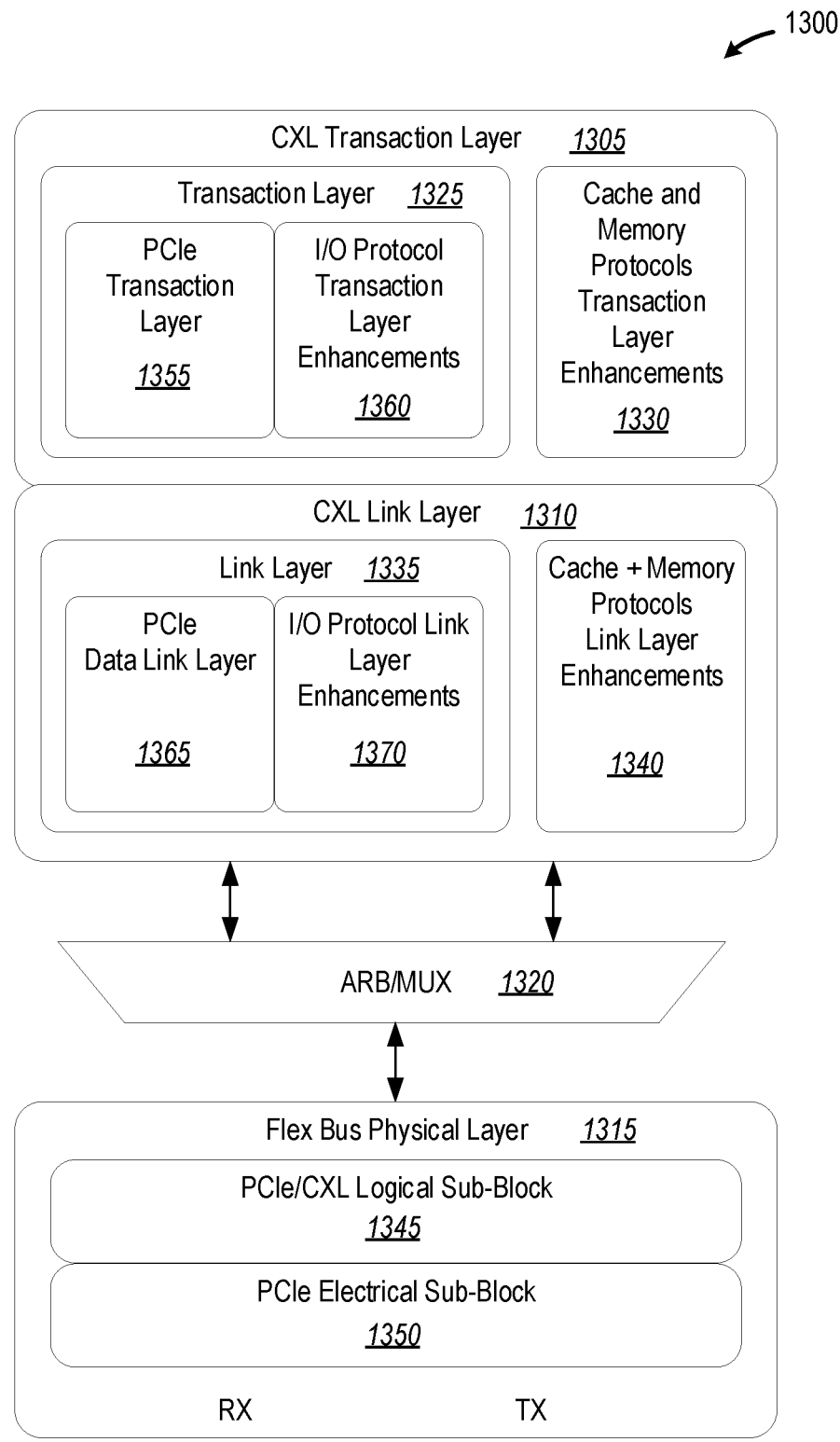
FIG. 13 illustrates a simplified block diagram illustrating an example port architecture utilized to implement CXL links.

FIG. 13 illustrates a simplified block diagram illustrating an example port architecture 1300 (e.g., Flex Bus) utilized to implement CXL links. For instance, Flex Bus architecture may be organized as multiple layers to implement the multiple protocols supported by the port. For instance, the port may include transaction layer logic (e.g., 1305), link layer logic (e.g., 1310), and physical layer logic (e.g., 1315) (e.g., implemented all or in-part in circuitry). For instance, a transaction (or protocol) layer (e.g., 1305) may be subdivided into transaction layer logic 1325 that implements a PCIe transaction layer 1355 and CXL transaction layer enhancements 1360 (for CXL.io) of a base PCIe transaction layer 1355, and logic 1330 to implement cache (e.g., CXL.cache) and memory (e.g., CXL.mem) protocols for a CXL link. Similarly, link layer logic 1335 may be provided to implement a base PCIe data link layer 1365 and a CXL link layer (for CXl.io) representing an enhanced version of the PCIe data link layer 1365. A CXL link layer 1310 may also include cache and memory link layer enhancement logic 1340 (e.g., for CXL.cache and CXL.mem).

Continuing with the example of FIG. 13, a CXL link layer logic 1310 may interface with CXL arbitration/multiplexing (ARB/MUX) logic 1320, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 1315 based on a PCIe physical layer (e.g., PCIe electrical PHY 1350). For instance, a Flex Bus physical layer may be implemented as a converged logical physical layer 1345 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., x16, x8, x4, x2, x1, etc.). In PCIe mode, links implemented by the port 1300 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

FIGS. 14-18 below provide some example computing devices, computing environments, hardware, software or flows that may be used in the context of embodiments as described herein.

Figure 14:
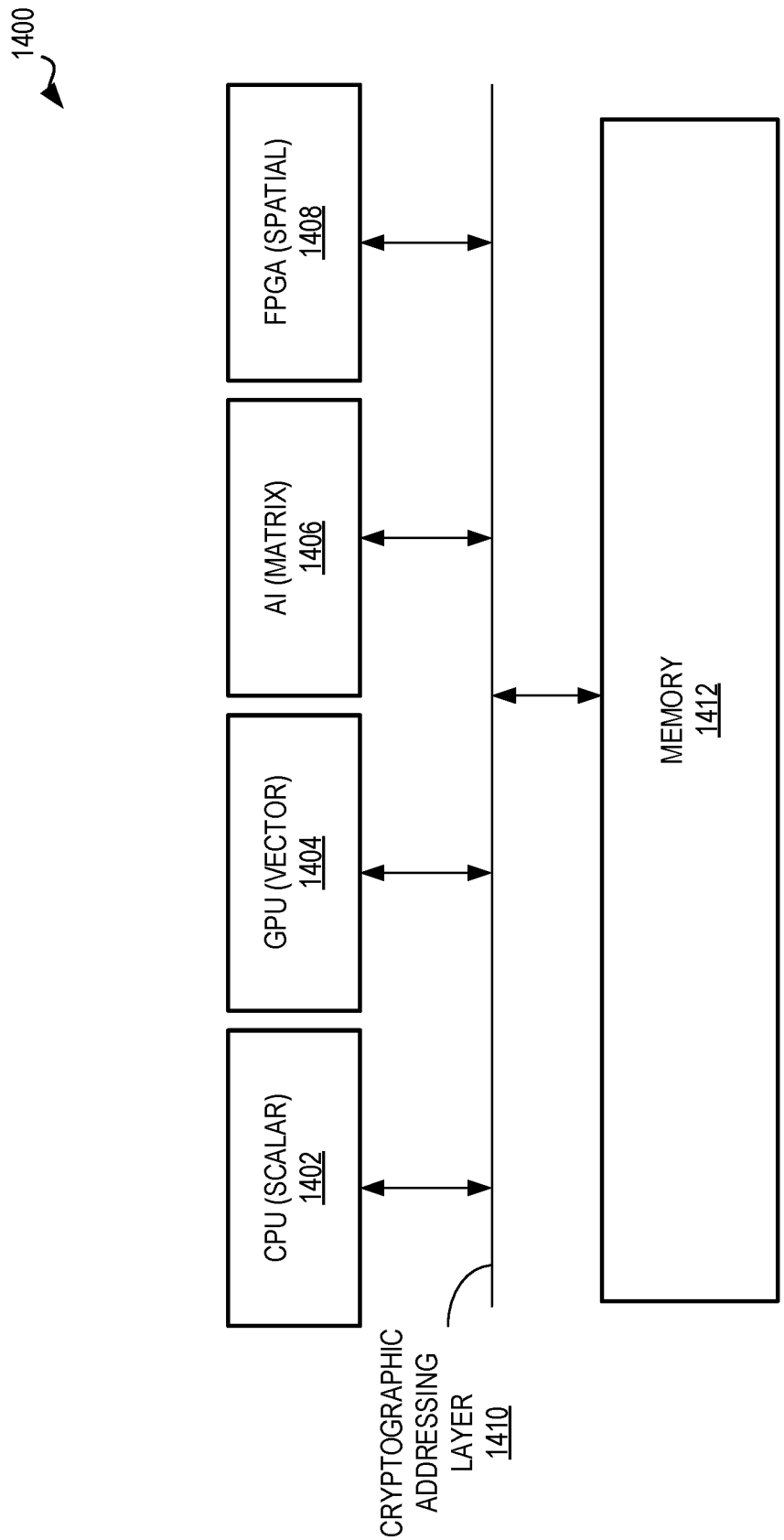
FIG. 14 is a block diagram illustrating an example cryptographic computing environment according to at least one embodiment.

FIG. 14 is a block diagram illustrating an example cryptographic computing environment 1400 according to at least one embodiment. In the example shown, a cryptographic addressing layer 1410 extends across the example compute vectors central processing unit (CPU) 1402, graphical processing unit (GPU) 1404, artificial intelligence (AI) 1406, and field programmable gate array (FPGA) 1408. For example, the CPU 1402 and GPU 1404 may share the same virtual address translation for data stored in memory 1412, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 1412 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 15:
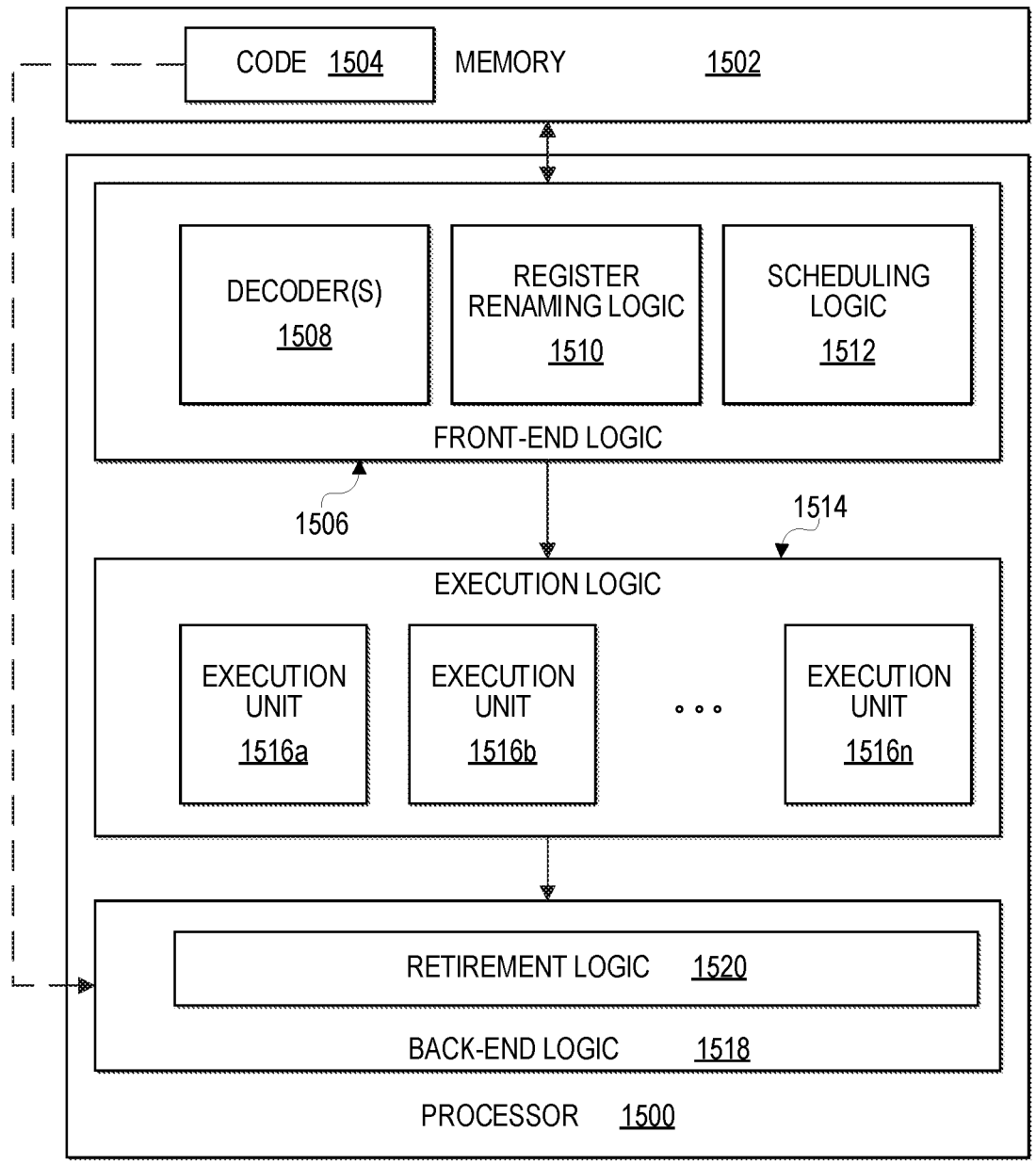
FIG. 15 is a block diagram illustrating an example processor according to at least one embodiment.

FIGS. 15-14 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 15-17.

FIG. 15 is an example illustration of a processor according to an embodiment. Processor 1500 is an example of a type of hardware device that can be used in connection with the implementations shown and described herein (e.g., processor 102). Processor 1500 may be any type of processor, such as a microprocessor, an embedded processor, a digital signal processor (DSP), a network processor, a multi-core processor, a single core processor, or other device to execute code. Although only one processor 1500 is illustrated in FIG. 15, a processing element may alternatively include more than one of processor 1500 illustrated in FIG. 15. Processor 1500 may be a single-threaded core or, for at least one embodiment, the processor 1500 may be multi-threaded in that it may include more than one hardware thread context (or "logical processor") per core.

FIG. 15 also illustrates a memory 1502 coupled to processor 1500 in accordance with an embodiment. Memory 1502 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1500 can execute any type of instructions associated with algorithms, processes, or operations detailed herein. Generally, processor 1500 can transform an element or an article (e.g., data) from one state or thing to another state or thing.

Code 1504, which may be one or more instructions to be executed by processor 1500, may be stored in memory 1502, or may be stored in software, hardware, firmware, or any suitable combination thereof, or in any other internal or external component, device, element, or object where appropriate and based on particular needs. In one example, processor 1500 can follow a program sequence of instructions indicated by code 1504. Each instruction enters a front-end logic 1506 and is processed by one or more decoders 1508. The decoder may generate, as its output, a micro operation such as a fixed width micro operation in a predefined format, or may generate other instructions, microinstructions, or control signals that reflect the original code instruction. Front-end logic 1506 also includes register renaming logic 1510 and scheduling logic 1512, which generally allocate resources and queue the operation corresponding to the instruction for execution.

Processor 1500 can also include execution logic 1514 having a set of execution units 1516a, 1516b, 1516n, etc. Some embodiments may include a number of execution units dedicated to specific functions or sets of functions. Other embodiments may include only one execution unit or one execution unit that can perform a particular function. Execution logic 1514 performs the operations specified by code instructions.

After completion of execution of the operations specified by the code instructions, back-end logic 1518 can retire the instructions of code 1504. In one embodiment, processor 1500 allows out of order execution but requires in order retirement of instructions. Retirement logic 1520 may take a variety of known forms (e.g., re-order buffers or the like). In this manner, processor 1500 is transformed during execution of code 1504, at least in terms of the output generated by the decoder, hardware registers and tables utilized by register renaming logic 1510, and any registers (not shown) modified by execution logic 1514.

Although not shown in FIG. 15, a processing element may include other elements on a chip with processor 1500. For example, a processing element may include memory control logic along with processor 1500. The processing element may include I/O control logic and/or may include I/O control logic integrated with memory control logic. The processing element may also include one or more caches. In some embodiments, non-volatile memory (such as flash memory or fuses) may also be included on the chip with processor 1500.

Figures 16A, 16B:
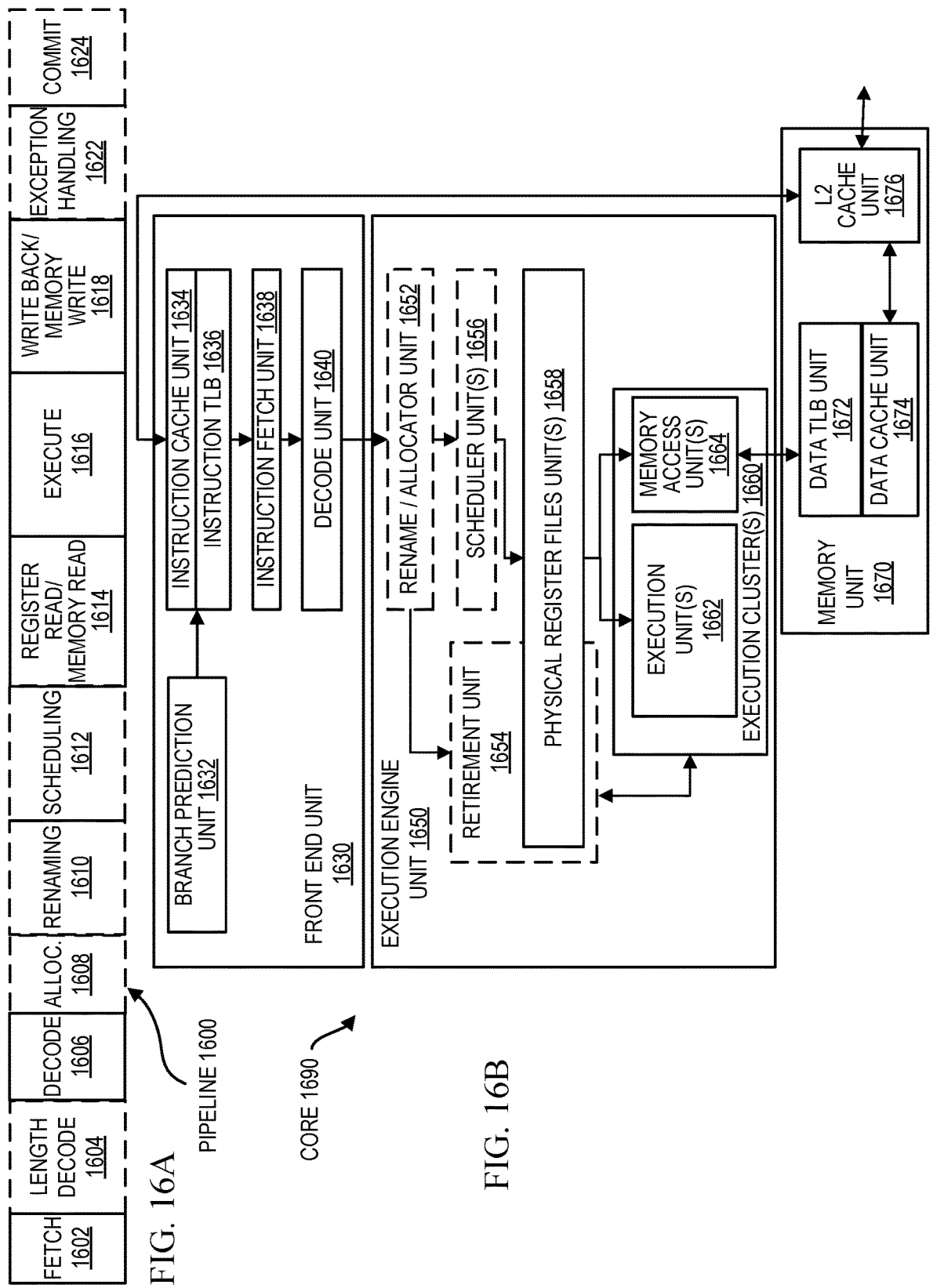
FIG. 16A is a block diagram illustrating both an exemplary in-order pipeline and an exemplary register renaming, out-of-order issue/execution pipeline in accordance with certain embodiments.
FIG. 16B is a block diagram illustrating both an exemplary embodiment of an in-order architecture core and an exemplary register renaming, out-of-order issue/execution architecture core to be included in a processor in accordance with certain embodiments.

FIG. 16A is a block diagram illustrating both an exemplary in-order pipeline and an exemplary register renaming, out-of-order issue/execution pipeline according to one or more embodiments of this disclosure. FIG. 16B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 16A-16B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. Processor core 1690 and memory unit 1670 are examples of the types of hardware that can be used in connection with the implementations shown and described herein (e.g., processor 102, memory 120). The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like. In addition, processor core 1690 and its components represent example architecture that could be used to implement logical processors and their respective components.

The front end unit 1630 includes a branch prediction unit 1632 coupled to an instruction cache unit 1634, which is coupled to an instruction translation lookaside buffer (TLB) unit 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers (GPRs). In at least some embodiments described herein, register units 1658 are examples of the types of hardware that can be used in connection with the implementations shown and described herein (e.g., registers 110). The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1662 may also include an address generation unit to calculate addresses used by the core to access main memory (e.g., memory unit 1670) and a page miss handler (PMH).

The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory. In addition, a page miss handler may also be included in core 1690 to look up an address mapping in a page table if no match is found in the data TLB unit 1672.

By way of example, the exemplary register renaming, out-of-order issue/execution core architecture may implement the pipeline 1600 as follows: 1) the instruction fetch unit 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the scheduling stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 17:
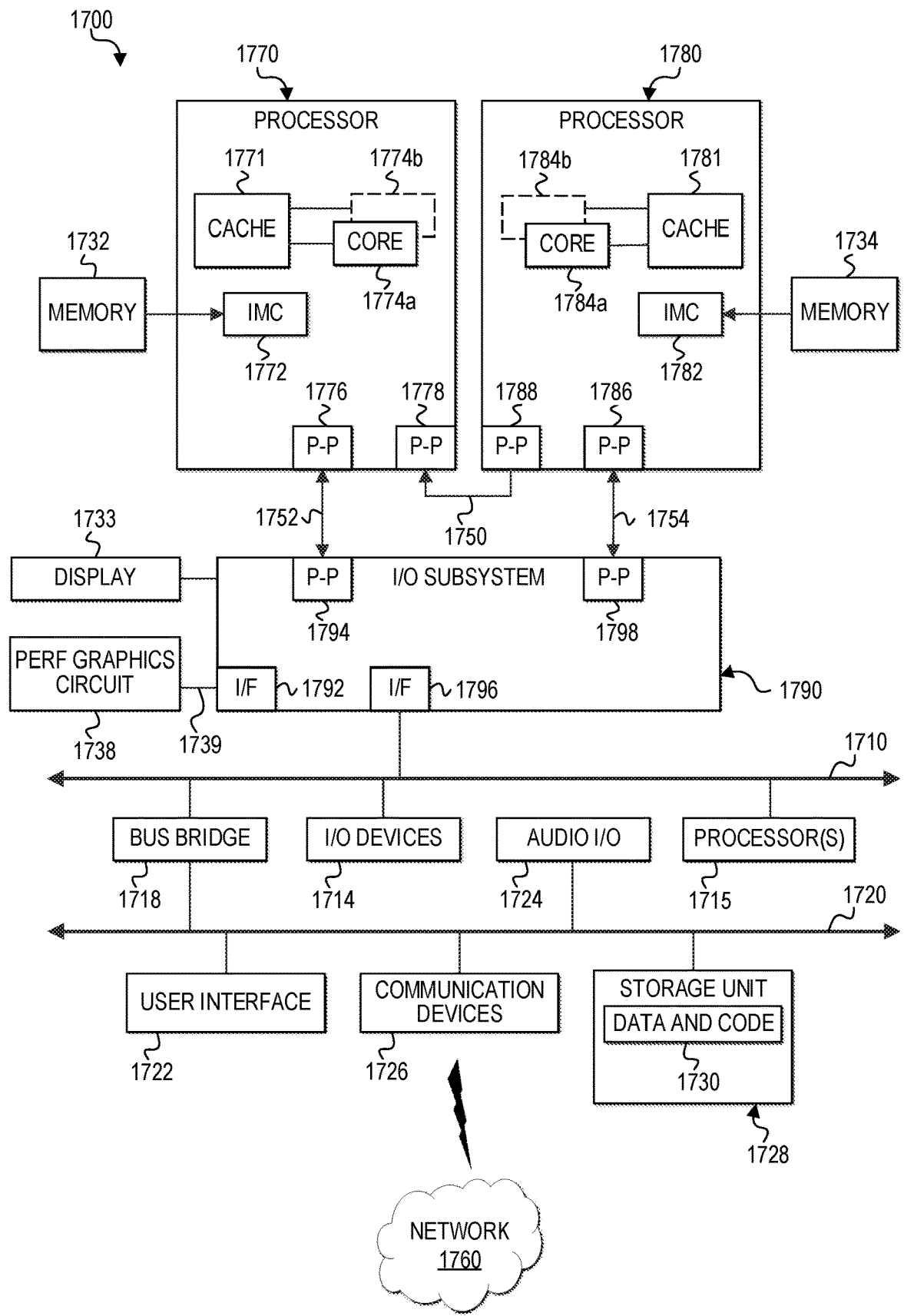
FIG. 17 is a block diagram of an example computer architecture according to at least one embodiment.

FIG. 17 illustrates a computing system 1700 that is arranged in a point-to-point (PtP) configuration according to an embodiment. In particular, FIG. 17 shows a system where processors, memory, and input/output devices are interconnected by a number of point-to-point interfaces. Generally, one or more of the computing systems or computing devices described herein may be configured in the same or similar manner as computing system 1700.

Processors 1770 and 1780 may be implemented as single core processors 1774a and 1784a or multi-core processors 1774a-1774b and 1784a-1784b. Processors 1770 and 1780 may each include a cache 1771 and 1781 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1700. Moreover, processors 1770 and 1780 are examples of the types of hardware that can be used in connection with the implementations shown and described herein (e.g., processor 102).

Processors 1770 and 1780 may also each include integrated memory controller logic (IMC) 1772 and 1782 to communicate with memory elements 1732 and 1734, which may be portions of main memory locally attached to the respective processors. In alternative embodiments, memory controller logic 1772 and 1782 may be discrete logic separate from processors 1770 and 1780. Memory elements 1732 and/or 1734 may store various data to be used by processors 1770 and 1780 in achieving operations and functionality outlined herein.

Processors 1770 and 1780 may be any type of processor, such as those discussed in connection with other figures. Processors 1770 and 1780 may exchange data via a point-to-point (PtP) interface 1750 using point-to-point interface circuits 1778 and 1788, respectively. Processors 1770 and 1780 may each exchange data with an input/output (I/O) subsystem 1790 via individual point-to-point interfaces 1752 and 1754 using point-to-point interface circuits 1776, 1786, 1794, and 1798. I/O subsystem 1790 may also exchange data with a high-performance graphics circuit 1738 via a high-performance graphics interface 1739, using an interface circuit 1792, which could be a PtP interface circuit. In one embodiment, the high-performance graphics circuit 1738 is a special-purpose processor, such as, for example, a high-throughput MIC processor, a network or communication processor, compression engine, graphics processor, GPGPU, embedded processor, or the like. I/O subsystem 1790 may also communicate with a display 1733 for displaying data that is viewable by a human user. In alternative embodiments, any or all of the PtP links illustrated in FIG. 17 could be implemented as a multi-drop bus rather than a PtP link.

I/O subsystem 1790 may be in communication with a bus 1710 via an interface circuit 1796. Bus 1710 may have one or more devices that communicate over it, such as a bus bridge 1718, I/O devices 1714, and one or more other processors 1715. Via a bus 1720, bus bridge 1718 may be in communication with other devices such as a user interface 1722 (such as a keyboard, mouse, touchscreen, or other input devices), communication devices 1726 (such as modems, network interface devices, or other types of communication devices that may communicate through a computer network 1760), audio I/O devices 1724, and/or a storage unit 1728. Storage unit 1728 may store data and code 1730, which may be executed by processors 1770 and/or 1780. In alternative embodiments, any portions of the bus architectures could be implemented with one or more PtP links.

Program code, such as code 1730, may be applied to input instructions to perform the functions described herein and generate output information. The output information may be applied to one or more output devices, in known fashion. For purposes of this application, a processing system may be part of computing system 1700 and includes any system that has a processor, such as, for example; a digital signal processor (DSP), a microcontroller, an application specific integrated circuit (ASIC), or a microprocessor.

The program code (e.g., 1730) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
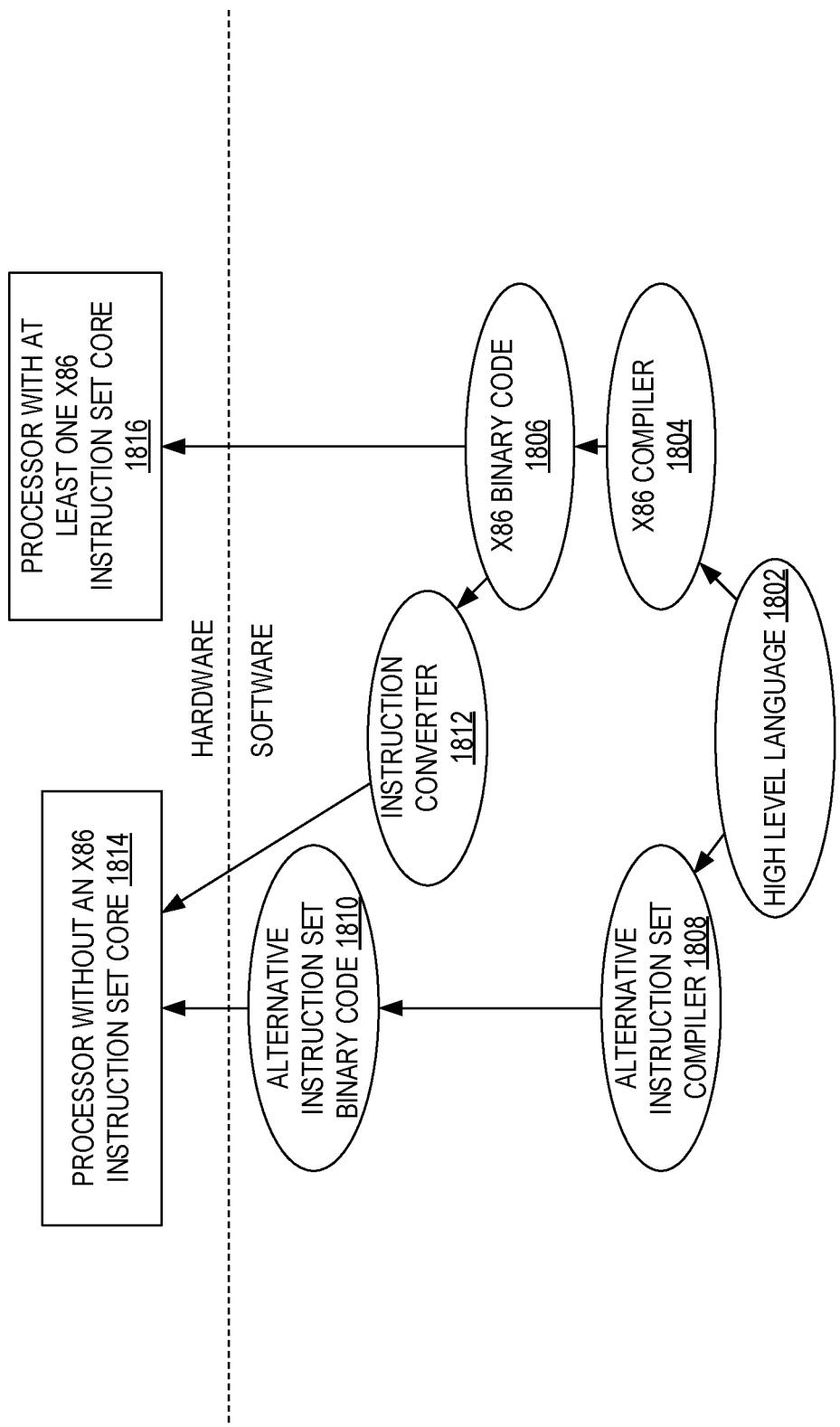
FIG. 18 is a block diagram contrasting the use of a software instruction converter to convert binary instructions in a source instruction set to binary instructions in a target instruction set according to embodiments of the present disclosure.

FIG. 18 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

One or more aspects of at least one embodiment may be implemented by representative instructions stored on a machine readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine readable media containing instructions or containing design data, such as Hardware Description Language (HDL), which defines structures, circuits, apparatuses, processors and/or system features described herein. Such embodiments may also be referred to as program products.

The computing system depicted in FIG. 17 is a schematic illustration of an embodiment of a computing system that may be utilized to implement various embodiments discussed herein. It will be appreciated that various components of the system depicted in FIG. 17 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLES

Example C1 relates to one or more non-transitory computer-readable media comprising instructions to cause an electronic device, upon execution of the instructions by one or more processors of the electronic device, to: obtain device capability information for a host node and a remote node across a network from the host node, the device capability information indicating whether the node can perform pointer-based cryptographic operations; direct an application executing on the host node to allocate a memory address of the remote node; select, based at least in part on the device capability information, one of the host node or the remote node to encrypt application data of the application; and configure the selected node to encrypt the application data based on a key and a pointer to the memory address of the remote node.

Example C2 includes the subject matter of Example C1, wherein the instructions are to implement a dynamic load balancing policy to select one of the host node and the remote node.

Example C3 includes the subject matter of Example C1 or C2, wherein the device capability information for each node includes capability information for an infrastructure processing unit (IPU) of the node.

Example C4 includes the subject matter of Example C3, wherein the instructions are to configure the IPU of the selected node to encrypt the application data.

Example C5 includes the subject matter of any previous Example C, wherein the instructions are to configure the selected node via memory mapped input/output (MMIO) commands.

Example C6 includes the subject matter of any previous Example C, wherein the instructions are to direct the application to allocation the memory address of the remote node for core data.

Example C7 includes the subject matter of any previous Example C, wherein the instructions are to direct the application to allocation the memory address of the remote node for input/output (IO) device data or code.

Example M1 includes a method comprising: obtaining device capability information for a host node and a remote node across a network from the host node, the device capability information indicating whether the remote node can perform pointer-based cryptographic operations; directing an application executing on the host node to allocate a memory address of the remote node; selecting, based at least in part on the device capability information, one of the host node or the remote node to encrypt application data of the application; and configuring the selected node to encrypt the application data based on a key and a pointer to the memory address of the remote node.

Example M2 includes the subject matter of Example M1, wherein the selection is based further on one or more of processing workloads of the host node and the remote node, a type of processor in the host node and the remote node, and a geolocation of the remote node.

Example M3 includes the subject matter of Example M1 or M2, wherein the application is directed to allocate the memory address of the remote node for core data.

Example M4 includes the subject matter of any previous Example M, wherein the application is directed to allocate the memory address of the remote node for input/output (IO) device data or code.

Example M5 includes the subject matter of any previous Example M, wherein the host node is selected, and the method further comprises encrypting the application data at the host node and transmitting the encrypted application data to the remote node for storage at the allocated memory address.

Example M6 includes the subject matter of Example M5, wherein the encryption is performed by an infrastructure processing unit (IPU) of the host node, the IPU comprising a processor and a network interface.

Example M7 includes the subject matter of any previous Example M, wherein the remote node is selected, and the method further comprises transmitting the application data to the remote node and encrypting the application data at the remote node.

Example M8 includes the subject matter of Example M7, wherein the encryption is performed by an infrastructure processing unit (IPU) of the remote node, the IPU comprising a processor and a network interface.

Example L1 relates to an apparatus comprising means to perform one or more elements of a method of any one of Examples M1-M8.

Example L2 relates to one or more non-transitory computer-readable media comprising instructions to cause an electronic device, upon execution of the instructions by one or more processors of the electronic device, to perform one or more elements of a method of any one of Examples M1-M8.

Example L3 relates to machine-readable storage including machine-readable instructions which, when executed, implement the method of any one of M1-M8.

Example L4 relates to an apparatus comprising: one or more processors and one or more computer-readable media comprising instructions that, when executed by the one or more processors, cause the one or more processors to perform the method of any one of Examples M1-M8.

Example S1 includes a system comprising: a processor to allocate a memory address to an application executing on the processor, the memory address of a memory across a network; an encryption engine comprising circuitry to: obtain application data and the memory address; and encrypt the application data based on a key and a pointer to the memory address; and network interface circuitry to provide communication between the processor and the memory across the network.

Example S2 includes the subject matter of Example S1, wherein the network interface circuitry is to provide communication between the processor and the memory across the network via a Remote Direct Memory Access (RDMA)-based protocol.

Example S3 includes the subject matter of Example S1, wherein the system includes a system-on-chip (SoC) that comprises the processor and the encryption engine.

Example S4 includes the subject matter of Example S1, wherein the system includes a system-on-chip (SoC) that comprises the processor and an infrastructure processing unit (IPU) coupled to the SoC, the IPU comprising the encryption engine and the network interface circuitry.

Example S5 includes the subject matter of Example S1, wherein the system includes a first system-on-chip (SoC) that comprises the processor and a second SoC coupled to the memory, the second SoC comprising the encryption engine.

The invention claimed is:

1. One or more non-transitory computer-readable media comprising instructions to cause an electronic device, upon execution of the instructions by one or more processors of the electronic device, to:
   obtain device capability information for a host node and a remote node across a network from the host node, the device capability information indicating whether the node can perform pointer-based cryptographic operations;
   direct an application executing on the host node to allocate a memory address of the remote node;
   select, based at least in part on the device capability information, one of the host node or the remote node to encrypt application data of the application; and
   configure the selected node to encrypt the application data based on using a key and a pointer to the memory address of the remote node.

2. The computer-readable media of claim 1, wherein the instructions are to implement a dynamic load balancing policy to select one of the host node and the remote node.

3. The computer-readable media of claim 1, wherein the device capability information for each node includes capability information for an infrastructure processing unit (IPU) of the node.

4. The computer-readable media of claim 3, wherein the instructions are to configure the IPU of the selected node to encrypt the application data.

5. The computer-readable media of claim 1, wherein the instructions are to configure the selected node via memory mapped input/output (MMIO) commands.

6. The computer-readable media of claim 1, wherein the instructions are to direct the application to allocate the memory address of the remote node for core data.

7. The computer-readable media of claim 1, wherein the instructions are to direct the application to allocate the memory address of the remote node for input/output (TO) device data or code.

8. A method comprising:
   obtaining device capability information for a host node and a remote node across a network from the host node, the device capability information indicating whether the remote node can perform pointer-based cryptographic operations;
   directing an application executing on the host node to allocate a memory address of the remote node;
   selecting, based at least in part on the device capability information, one of the host node or the remote node to encrypt application data of the application; and
   configuring the selected node to encrypt the application data using a key and a pointer to the memory address of the remote node.

9. The method of claim 8, wherein the selection is based further on one or more of processing workloads of the host node and the remote node, a type of processor in the host node and the remote node, and a geolocation of the remote node.

10. The method of claim 8, wherein the application is directed to allocate the memory address of the remote node for core data.

11. The method of claim 8, wherein the application is directed to allocate the memory address of the remote node for input/output (TO) device data or code.

12. The method of claim 8, wherein the host node is selected, and the method further comprises encrypting the application data at the host node and transmitting the encrypted application data to the remote node for storage at the allocated memory address.

13. The method of claim 12, wherein the encryption is performed by an infrastructure processing unit (IPU) of the host node, the IPU comprising a processor and a network interface.

14. The method of claim 8, wherein the remote node is selected, and the method further comprises transmitting the application data to the remote node and encrypting the application data at the remote node.

15. The method of claim 14, wherein the encryption is performed by an infrastructure processing unit (IPU) of the remote node, the IPU comprising a processor and a network interface.

16. A system comprising:
   a processor to allocate a memory address to an application executing on the processor, the memory address of a memory across a network;
   an encryption engine comprising circuitry to:
      obtain application data and the memory address; and
      encrypt the application data using a key and a pointer to the memory address; and
   network interface circuitry to provide communication between the processor and the memory across the network.

17. The system of claim 16, wherein the network interface circuitry is to provide communication between the processor and the memory across the network via a Remote Direct Memory Access (RDMA)-based protocol.

18. The system of claim 16, wherein the system includes a system-on-chip (SoC) that comprises the processor and the encryption engine.

19. The system of claim 16, wherein the system includes a system-on-chip (SoC) that comprises the processor and an infrastructure processing unit (IPU) coupled to the SoC, the IPU comprising the encryption engine and the network interface circuitry.

20. The system of claim 16, wherein the system includes a first system-on-chip (SoC) that comprises the processor and a second SoC coupled to the memory, the second SoC comprising the encryption engine.

\* \* \* \* \*